US007815880B2

(12) United States Patent
Constantz et al.

(10) Patent No.: US 7,815,880 B2
(45) Date of Patent: *Oct. 19, 2010

(54) REDUCED-CARBON FOOTPRINT CONCRETE COMPOSITIONS

(75) Inventors: Brent R. Constantz, Portola Valley, CA (US); Andrew Youngs, Los Gatos, CA (US); Terence C. Holland, Auburn Township, OH (US)

(73) Assignee: Calera Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,383

(22) Filed: Oct. 22, 2009

(65) Prior Publication Data

US 2010/0083880 A1    Apr. 8, 2010

Related U.S. Application Data

(63) Continuation-in-part of application No. 12/571,398, filed on Sep. 30, 2009.

(60) Provisional application No. 61/110,489, filed on Oct. 31, 2008, provisional application No. 61/149,610, filed on Feb. 3, 2009, provisional application No. 61/246,042, filed on Sep. 25, 2009, provisional application No. 61/101,631, filed on Sep. 30, 2008, provisional application No. 61/107,645, filed on Oct. 22, 2008, provisional application No. 61/116,141, filed on Nov. 19, 2008, provisional application No. 61/117,542, filed on Nov. 24, 2008, provisional application No. 61/148,353, filed on Jan. 29, 2009, provisional application No. 61/149,640, filed on Feb. 3, 2009, provisional application No. 61/225,880, filed on Jul. 15, 2009, provisional application No. 61/234,251, filed on Aug. 14, 2009.

(51) Int. Cl.
*C01B 21/34* (2006.01)

(52) U.S. Cl. .................. 423/220; 106/713; 106/817; 210/717; 210/718; 210/749; 423/419.1; 423/437.1

(58) Field of Classification Search ................ 210/702, 210/710, 714, 717, 718, 723, 724, 726, 768–774, 210/806, 748, 749; 423/170, 184, 430, 431, 423/437.1, 438, 439, 441, 155, 165, 173, 423/220, 232, 158, 419.1; 106/461, 462, 106/713–715, 718, 723, 738, 739, 638, 811–819; 204/157.47, 515; 588/252, 2, 257, 251, 400
See application file for complete search history.

(56) References Cited

U.S. PATENT DOCUMENTS 1,678,345 A    7/1928    Mattison (Continued)

FOREIGN PATENT DOCUMENTS

AU    2007100157    4/2007

(Continued)

OTHER PUBLICATIONS

"Electrochemical cell", WIKIPEDIA (2009), http:en.wikipedia.org/wiki/Electrochemical_Cell, Nov. 24, 2009, 5 pp.

(Continued)

*Primary Examiner*—Joseph W Drodge

(57) ABSTRACT

Reduced-carbon footprint concrete compositions, and methods for making and using the same, are provided. Aspects of the reduced-carbon footprint concrete compositions include $CO_2$-sequestering carbonate compounds, which may be present in the hydraulic cement and/or aggregate components of the concrete. The reduced-carbon footprint concrete compositions find use in a variety of applications, including use in a variety of building materials and building applications.

16 Claims, 12 Drawing Sheets

U.S. PATENT DOCUMENTS

Figure 1:
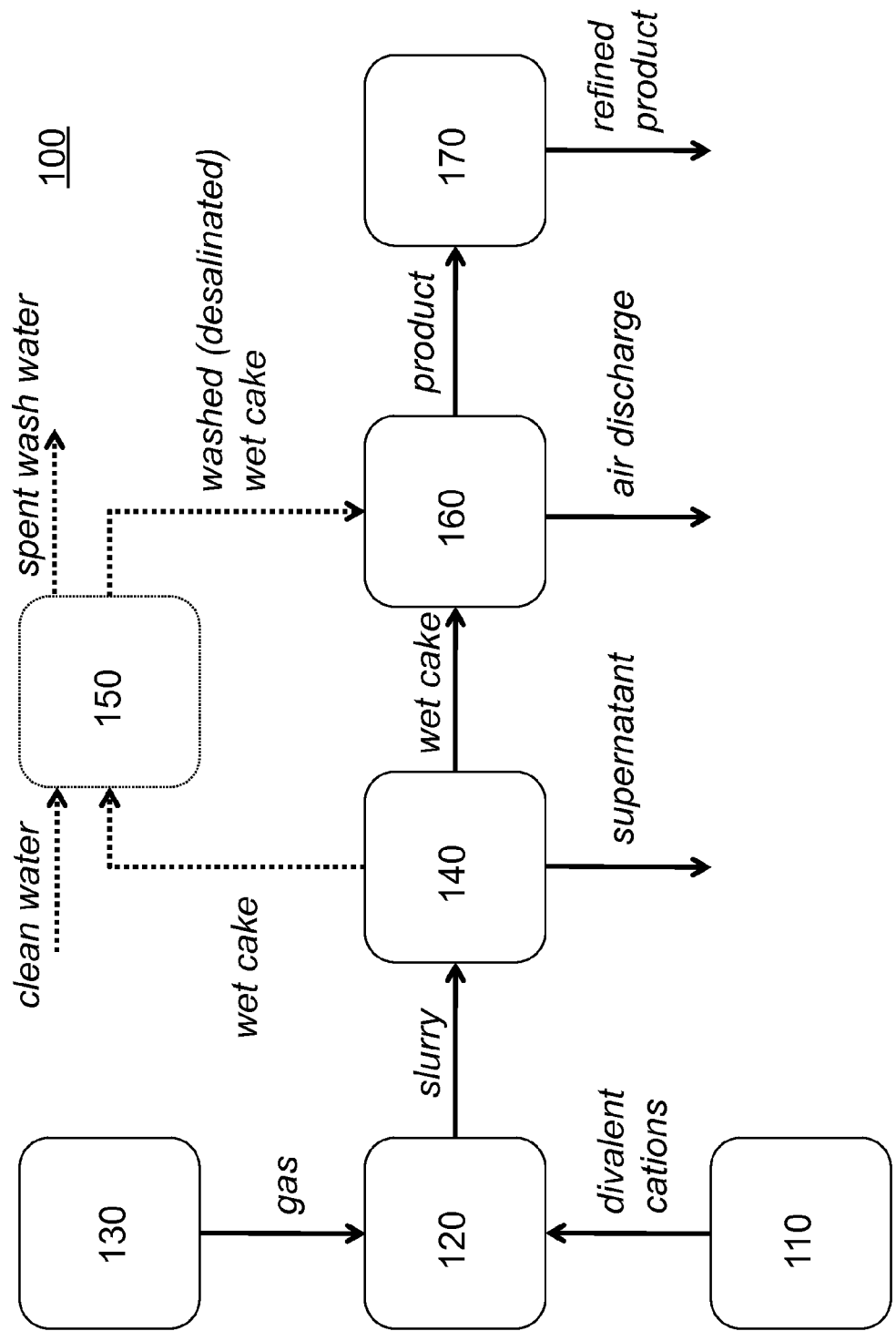

| | | |
|---|---|---|
| 1,865,833 A | 7/1932 | Chesny |
| 1,897,725 A | 2/1933 | Gaus et al. |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,179,579 A | 4/1965 | Gustave et al. |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,574,530 A | 4/1971 | Suriani et al. |
| 3,627,479 A | 12/1971 | Yee |
| 3,725,267 A | 4/1973 | Gelblum |
| 3,864,236 A | 2/1975 | Lindstrom |
| 3,904,496 A | 9/1975 | Harke et al. |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A | 6/1976 | Lindstrom |
| 3,970,528 A | 7/1976 | Zirngiebl et al. |
| 4,026,716 A | 5/1977 | Urschel, III et al. |
| 4,036,749 A | 7/1977 | Anderson |
| 4,080,270 A | 3/1978 | O'Leary et al. |
| 4,107,022 A | 8/1978 | Strempel et al. |
| 4,128,462 A | 12/1978 | Ghiringhelli et al. |
| 4,140,510 A | 2/1979 | Scholze et al. |
| 4,147,599 A | 4/1979 | O'Leary et al. |
| 4,188,291 A | 2/1980 | Anderson |
| 4,217,186 A | 8/1980 | McRae |
| 4,242,185 A | 12/1980 | McRae |
| 4,246,075 A | 1/1981 | Hilbertz |
| 4,264,367 A | 4/1981 | Schutz |
| 4,335,788 A | 6/1982 | Murphey et al. |
| 4,361,475 A | 11/1982 | Moeglich |
| 4,370,307 A | 1/1983 | Judd |
| 4,376,101 A | 3/1983 | Sartori et al. |
| 4,410,606 A | 10/1983 | Loutfy et al. |
| 4,450,009 A | 5/1984 | Childs et al. |
| 4,477,573 A | 10/1984 | Taufen |
| 4,561,945 A | 12/1985 | Coker et al. |
| 4,588,443 A | 5/1986 | Bache |
| 4,620,969 A | 11/1986 | Wilkinson |
| 4,716,027 A | 12/1987 | Morrison |
| 4,804,449 A | 2/1989 | Sweeney |
| 4,818,367 A | 4/1989 | Winkler |
| 4,838,941 A | 6/1989 | Hill |
| 4,899,544 A | 2/1990 | Boyd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,230,734 A | 7/1993 | Kumasaka et al. |
| 5,246,551 A | 9/1993 | Pletcher et al. |
| 5,282,935 A | 2/1994 | Cawlfield et al. |
| 5,362,688 A | 11/1994 | Porta et al. |
| 5,364,611 A | 11/1994 | Iijima et al. |
| 5,366,513 A | 11/1994 | Goldmann et al. |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,547,027 A | 8/1996 | Chan et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,624,493 A | 4/1997 | Wagh et al. |
| 5,702,585 A | 12/1997 | Hillrichs et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,846,669 A | 12/1998 | Smotkin et al. |
| 5,855,759 A | 1/1999 | Keating et al. |
| 5,897,704 A | 4/1999 | Baglin |
| 5,925,255 A | 7/1999 | Mukhopadhyay |
| 5,965,201 A * | 10/1999 | Jones, Jr. ................... 427/243 |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,129,832 A | 10/2000 | Fuhr et al. |
| 6,180,012 B1 | 1/2001 | Rongved |
| 6,190,428 B1 | 2/2001 | Rolison et al. |
| 6,200,543 B1 | 3/2001 | Allebach et al. |
| 6,217,728 B1 | 4/2001 | Lehmann et al. |
| 6,235,186 B1 | 5/2001 | Tanaka et al. |
| 6,251,356 B1 | 6/2001 | Mathur |
| 6,264,740 B1 * | 7/2001 | McNulty, Jr. ............... 106/817 |
| 6,280,505 B1 | 8/2001 | Torkildsen et al. |
| 6,293,731 B1 * | 9/2001 | Studer ..................... 405/129.2 |
| 6,352,576 B1 | 3/2002 | Spencer et al. |
| 6,375,825 B1 | 4/2002 | Mauldin et al. |
| 6,387,212 B1 | 5/2002 | Christian |
| 6,402,831 B1 | 6/2002 | Sawara et al. |
| 6,416,574 B1 | 7/2002 | Steelhammer et al. |
| 6,444,107 B2 | 9/2002 | Hartel et al. |
| 6,475,460 B1 | 11/2002 | Max |
| 6,495,013 B2 | 12/2002 | Mazur et al. |
| 6,517,631 B1 * | 2/2003 | Bland ......................... 106/705 |
| 6,518,217 B2 | 2/2003 | Xing et al. |
| 6,537,456 B2 | 3/2003 | Mukhopadhyay |
| 6,602,630 B1 | 8/2003 | Gopal |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,890,419 B2 | 5/2005 | Reichman et al. |
| 6,890,497 B2 | 5/2005 | Rau et al. |
| 6,908,507 B2 * | 6/2005 | Lalande et al. ............... 106/739 |
| 6,936,573 B2 | 8/2005 | Wertz et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,198,722 B2 | 4/2007 | Hussain |
| 7,261,912 B2 | 8/2007 | Zeigler |
| 7,282,189 B2 | 10/2007 | Zauderer |
| 7,285,166 B2 | 10/2007 | Luke et al. |
| 7,347,896 B2 | 3/2008 | Harrison |
| 0,178,739 A1 | 7/2008 | Lewnard et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,595,001 B2 | 9/2009 | Arakel et al. |
| 7,674,443 B1 * | 3/2010 | Davis ........................ 423/220 |
| 2001/0022952 A1 | 9/2001 | Rau et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2003/0017088 A1 | 1/2003 | Downs et al. |
| 2003/0126899 A1 | 7/2003 | Wolken |

| | | |
|---|---|---|
| 2003/0188668 A1 | 10/2003 | Bland |
| 2004/0014845 A1 | 1/2004 | Takamura et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0126293 A1 | 7/2004 | Geerlings et al. |
| 2004/0213705 A1 | 10/2004 | Blencoe et al. |
| 2004/0219090 A1 | 11/2004 | Dziedzic et al. |
| 2004/0228788 A1 | 11/2004 | Nagai et al. |
| 2004/0231568 A1 | 11/2004 | Morioka et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0118081 A1 | 6/2005 | Harris et al. |
| 2005/0129606 A1 | 6/2005 | Mitsuhashi et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0238563 A1 | 10/2005 | Eighmy et al. |
| 2005/0255174 A1 | 11/2005 | Shelley et al. |
| 2006/0048517 A1 | 3/2006 | Fradette et al. |
| 2006/0051274 A1 | 3/2006 | Wright et al. |
| 2006/0060532 A1 | 3/2006 | Davis |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0195002 A1 | 8/2006 | Grandjean et al. |
| 2006/0196836 A1 | 9/2006 | Arakel et al. |
| 2006/0288912 A1 | 12/2006 | Sun et al. |
| 2007/0056487 A1 | 3/2007 | Anthony et al. |
| 2007/0092427 A1 | 4/2007 | Anthony et al. |
| 2007/0148509 A1 | 6/2007 | Colbow et al. |
| 2007/0163443 A1 | 7/2007 | Moriyama et al. |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0240570 A1 | 10/2007 | Jadhav et al. |
| 2007/0261947 A1 | 11/2007 | Geerlings et al. |
| 2008/0031801 A1 | 2/2008 | Lackner et al. |
| 2008/0112868 A1 | 5/2008 | Blencoe et al. |
| 2008/0138265 A1 | 6/2008 | Lackner et al. |
| 2008/0171158 A1 | 7/2008 | Maddan |
| 2008/0223727 A1 | 9/2008 | Oloman et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0276553 A1* | 11/2008 | Ingjaldsdottir et al. ......... 52/184 |
| 2008/0277319 A1* | 11/2008 | Wyrsta ..................... 209/166 |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0081093 A1 | 3/2009 | Comrie |
| 2009/0081096 A1 | 3/2009 | Pellegrin |
| 2009/0090277 A1 | 4/2009 | Joshi et al. |
| 2009/0120644 A1* | 5/2009 | Roddy et al. ............... 166/292 |
| 2009/0143211 A1* | 6/2009 | Riman et al. ................ 501/1 |
| 2009/0148238 A1* | 6/2009 | Smith ..................... 405/129.2 |
| 2009/0169452 A1 | 7/2009 | Constantz et al. |
| 2009/0186244 A1 | 7/2009 | Mayer |
| 2009/0214408 A1* | 8/2009 | Blake et al. ................ 423/232 |
| 2009/0232861 A1 | 9/2009 | Wright et al. |
| 2009/0301352 A1 | 12/2009 | Constantz et al. |
| 2010/0024686 A1 | 2/2010 | Constantz et al. |

FOREIGN PATENT DOCUMENTS

| | | |
|---|---|---|
| CA | 1335974 A1 | 6/1995 |
| CA | 2646462 | 9/2007 |
| DE | 2653649 A1 | 6/1978 |
| DE | 3146326 A1 | 6/1983 |
| DE | 3638317 | 1/1986 |
| DE | 3638317 | 6/1987 |
| DE | 19523324 A1 | 9/1994 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| GB | 911386 A | 11/1962 |
| GB | 2371810 | 8/2002 |
| JP | 51102357 A1 | 9/1976 |
| JP | 59100280 | 12/1982 |
| JP | 59100280 | 6/1984 |
| JP | 1142093 | 11/1987 |
| JP | 63-312988 | 12/1988 |
| JP | 03-020491 | 1/1991 |
| JP | 7061842 A | 3/1995 |
| JP | 2003041388 | 7/2001 |
| JP | 2003041388 | 2/2003 |
| WO | WO 93/16216 A1 | 8/1993 |
| WO | WO 96/34997 A1 | 11/1996 |
| WO | WO 99/13967 A1 | 3/1999 |
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/078836 A2 | 8/2005 |
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/071633 A1 | 6/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |

| | | | |
|---|---|---|---|
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/039655 A1 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |
| WO | WO 2010/030826 | 3/2010 |

OTHER PUBLICATIONS

International Search Report dated Dec. 14, 2009 of PCT/US09/061748.
Aker, "Aker Clean Carbon, Carbon Capture Solutions Provider" Aker Clean Carbon Presentation for UN's IPCC; Jan. 24, 2008; 8 pp.
Alexander, G. et al., "Evaluation of reaction variables in the dissolution of serpentine for mineral carbonation"; Elsevier; ScienceDirect Fuel 86 (2007) 273-281.
Back, M. et al.,"Reactivity of Alkaline Lignite Fly Ashes Towards CO in Water." Environmental Science & Technology. vol. 42, No. 12 (2008) pp. 4520-4526.
Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.
"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.
Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.
Bond, G.M., et al. 2002. Brines as possible cation sources for biomimetic carbon dioxide sequestration. *American Geophysical Union* Abstract #U22A-07.
Cannell, M.G.R. 2003. "Carbon sequestration and biomass energy offset: theoretical, potential and achievable capacities globally, in Europe and the UK." Biomass and Bioenergy. 24: 97-116.
CICCS "Aims and Research"; www.nottingham.ac.uk/carbonmanagement/ccs_aims.php 2pp Aug. 3, 2007.
Druckenmiller et al., "Carbon sequestration using brine of adjusted pH to form mineral carbonates"; Elsevier; www.elsevier.com/locate/fuproc; Fuel Processing Technology 86 (2005) 1599-1614.
Faverjon, F. et al. 2005. Electrochemical study of a hydrogen diffusion anode-membrane assembly for membrane electrolysis. *Electrochimica Acta* 51 (3): 386-394.
Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.
Gain, E. et al. 2002. Ammonium nitrate wastewater treatment by coupled membrane electrolysis and electrodialysis. *Journal of Applied Electrochemistry* 32: 969-975.
Genders, D. 1995. Electrochemical Salt Splitting. http://www.electrosynthesis.com/news/mwatts.html (accessed Feb. 5, 2009).
Goldberg et al., "CO2 Mineral Sequestration Studies in US"; National Energy Technology Laboratory; goldberg@netl.doe.gov; 10pp, undated.
Graff "Just Catch—CO2 Capture Technology" Aker Kvaerner; Pareto Clean Energy Tech Seminar Oct. 11, 2007 25pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Haywood et al., "Carbon dioxide sequestration as stable carbonate minerals—environmental barriers"; Environmental Geology (2001) 41:11-16; Springer-Verlag 2001.
Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp, undated.
Holze, S. et al. 1994. Hydrogen Consuming Anodes for Energy Saving in Sodium Sulphate Electrolysis. *Chem. Eng. Technol.* 17: 382-389.
Huijgen, W.J.J., et al. 2003. Carbon dioxide sequestration by mineral carbonation. ECN-C-03-016; Energy Research Centre of the Netherlands: Petten; pp. 1-42.
Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.
Huntzinger, D.N. et al.,"Carbon Dioxide Sequestration in Cement Kiln Dust through Mineral Carbonation"; Environmental Science & Technology, vol. 43, No. 6 (2009) pp. 1986-1992.
International Search Report dated Sep. 17, 2008 of PCT/US2008/068564.
International Search Report dated Feb. 19, 2009 of PCT/US08/88242.
International Search Report dated Mar. 11, 2009 of PCT/US2008/088318.
International Search Report dated Mar. 11, 2009 of PCT/2008/088246.
International Search Report dated Aug. 5, 2009 of PCT/2009/048511.
International Search Report dated Sep. 8, 2009 of PCT/US2009/045722.
International Search Report dated Sep. 17, 2009 of PCT/US2009/050756.
International Search Report dated Sep. 22, 2009 of PCT/US2009/047711.
International Search Report dated Oct. 19, 2009 of PCT/US2009/050223.
International Search Report dated Oct. 30, 2009 of PCT/US2009/056573.
Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.
Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.
Lackner, K. "Carbonate Chemistry for Sequestering Fossil Carbon"; Annual Review Energy Environ. 2002 27:193-232.
Lackner, K.S. et al. "Carbon Dioxide Disposal in Carbonate Minerals." Energy. 1995. 20(11): 1153-1170.
Levy, D. "Burnt biomass causes short-term global cooling, long-term warming." http://news-service.stanford.edu/news/2004/august4/biomass-84.html. 3 pages.
Mazrou, S., et al. 1997. Sodium hydroxide and hydrochloric acid generation from sodium chloride and rock salt by electro-electrodialysis. *Journal of Applied Electrochemistry* 27: 558-567.
Montes-Hernandez, G. et al.,"Mineral sequestration of CO2 by aqueous carbonation of coal combustion fly-ash." Journal of Hazardous Materials vol. 161 (2009). pp. 1347-1354.
Nayak, V.S. "Nonelectrolytic Production of Caustic Soda and Hydrochloric Acid from Sodium Chloride"; Ind. Eng. Chem. Res. 1996. 35: 3808-3811.
O'Connor et al., "Carbon Dioxide Sequestration By Direct Mineral Carbonation: Results From Recent Studies and Current Status";

Albany Research Center, Albany Oregon; Office of Fossil Energy, US Dept. of Energy; 1st Annual DOE Carbon Sequestration Conference, Washington DC, May 2001 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Park, A., et al. 2004. CO2 mineral sequestration: physically activated dissolution of serpentine and pH swing process. *Chemical Engineering Science* 59 (22-23): 5241-5247.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Sadhwani et al., "Case Studies on environmental impact of seawater desalination" Science Direct; http://www.sciencedirect.com/science?_ob=ArticleURL&_udi=B6TFX-4HMX97J-3&_u... 3pp., undated.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp.

Tececo Pty LTD, "Eco-Cement"; www.tececo.com/simple.eco-cement.php; Dec. 29, 2008; 6pp., undated.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al., "Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632, filed Mar. 5, 2009, Kirk, Donald W. et al, Non-Final Office Action dated Sep. 8, 2009.

Wright, L.L., et al. 1993. "U.S. Carbon Offset Potential Using Biomass Energy Systems." Water, Air, and Soil Pollution. 70: 483-497.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Christiansen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

Huijgen, W.J.J., et al. 2005. Mineral CO2 Sequestration by Steel Slag Carbonation. *Environ. Sci. Technol.* 39: 9676-9682.

Huijgen, W.J.J., et al. 2006. Energy Consumption and Net CO2 Sequestration of Aqueous Mineral Carbonation. *Ind. Eng. Chem. Res.* 45: 9184-9194.

Huntzinger, D.N. et at. 2009. A life-cycle assessment of Portland cement manufacturing: comparing the traditional process with alternative technologies. *Journal of Cleaner Production*. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

International Search Report dated Jan. 4, 2010 of PCT/US09/062795.

International Search Report dated Jan. 13, 2010 of PCT/US09/059135.

International Search Report dated Feb. 2, 2010 of PCT/US09/059141.

International Search Report dated Feb. 24, 2010 of PCT/US09/067764.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Sethi, S. et al. 2006. Existing & Emerging Concentrate Minimization & Disposal Practices for Membrane Systems. *Florida Water Resources Journal*. pp. 38, 40, 42, 44, 46, 48.

Stanley, S.M., et al. 2002. Low-magnesium calcite produced by coralline algae in seawater of Late Cretaceous composition. *PNAS*. 99(24): 15323-15326.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/344,019, filed Dec. 24, 2008, Constantz, Brent R., et al, Non-Final Office Action dated Nov. 16, 2009.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Non-Final Office Action dated Mar. 1, 2010.

Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved on Dec. 29, 2009] <URL: http://www/jstage.jst.go.jp/article/geochemj/39/4/39_301/_article> ab.

Wen-Zhi et al., "Using Electrolytic Method to Promote CO2 Sequestration in Serpentine by Mineral Carbonation"; Journal of China University of Mining and Technology; vol. 36, No. 6; Nov. (2007) (Publication and English Translation).

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

\* cited by examiner

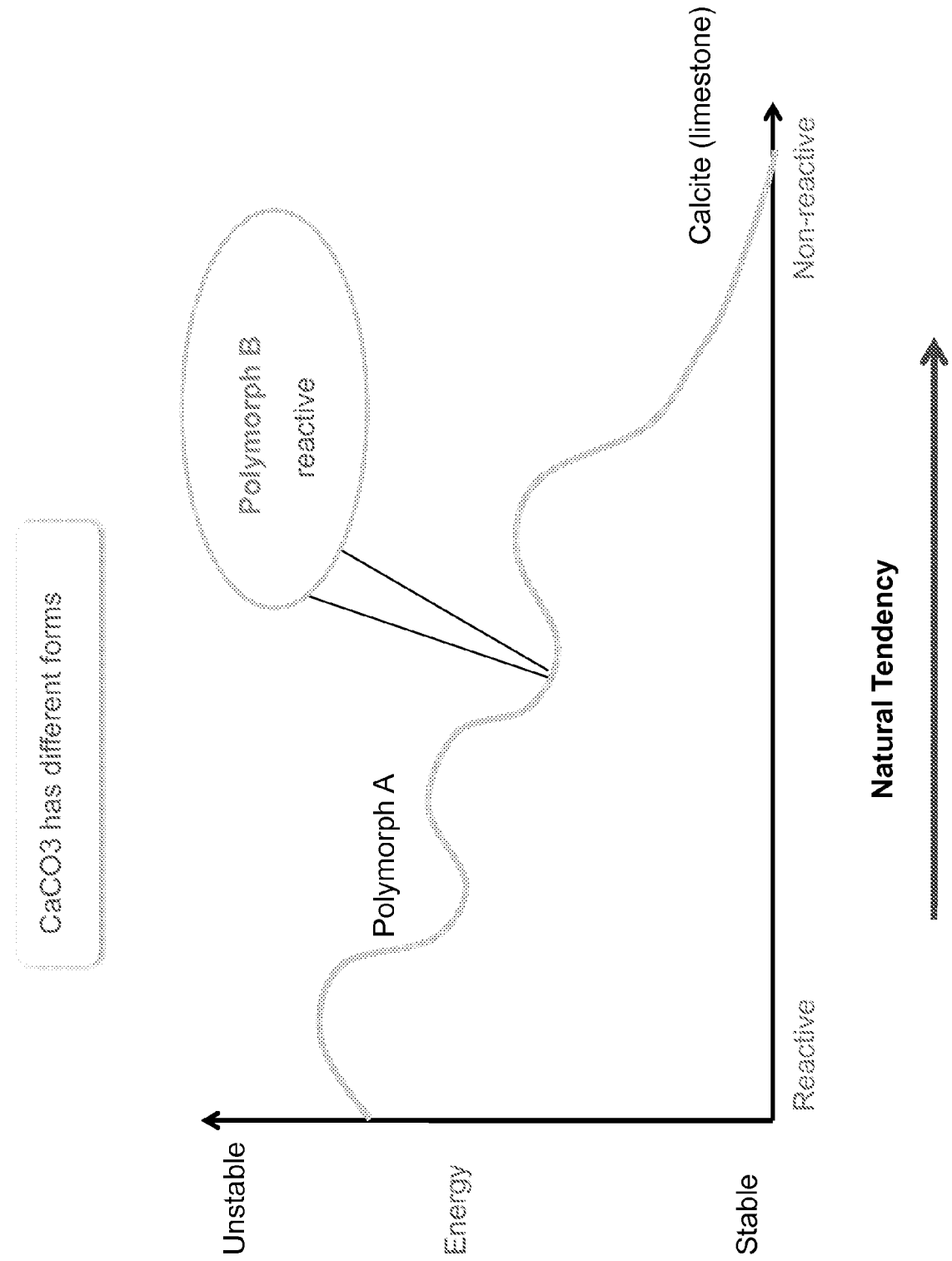

REDUCED-CARBON FOOTPRINT CONCRETE COMPOSITIONS

CROSS-REFERENCE

This application is a continuation-in-part application of U.S. patent application Ser. No. 12/571,398, filed 30 Sep. 2009, titled "$CO_2$-Sequestering Formed Building Materials," which claims the benefit of U.S. Provisional Patent Application No. 61/101,631, filed 30 Sep. 2008, titled "$CO_2$ Sequestration"; U.S. Provisional Patent Application No. 61/110,489, filed 31 Oct. 2008, titled "$CO_2$-Sequestering Formed Building Materials"; U.S. Provisional Patent Application No. 61/149,610, filed 3 Feb. 2009, titled "$CO_2$-Sequestering Formed Building Materials"; and U.S. Provisional Patent Application No. 61/246,042, filed 25 Sep. 2009, titled "$CO_2$-Sequestering Formed Building Materials," each of is incorporated herein by reference, and to each of which we claim priority. This application also claims the benefit of U.S. Provisional Patent Application No. 61/107,645, filed 22 Oct. 2008, titled "Low-Carbon Footprint Carbon Compositions"; U.S. Provisional Patent Application No. 61/116,141, filed 19 Nov. 2008, titled "Low-Carbon Footprint Carbon Compositions"; U.S. Provisional Patent Application No. 61/117,542, filed 24 Nov. 2008, titled "Low-Carbon Footprint Carbon Compositions"; U.S. Provisional Patent Application No. 61/148,353, filed 29 Jan. 2009, titled "Low-Carbon Footprint Carbon Compositions"; U.S. Provisional Patent Application No. 61/149,640, filed 3 Feb. 2009, titled "Low-Carbon Footprint Carbon Compositions"; U.S. Provisional Patent Application No. 61/225,880, filed 15 Jul. 2009, titled "Low-Carbon Footprint Carbon Compositions"; U.S. Provisional Patent Application No. 61/234,251, filed 14 Aug. 2009, titled "Methods and Systems for Treating Industrial Waste," each of which is incorporated herein by reference, and to each of which we claim priority.

BACKGROUND

Concrete is the most widely used engineering material in the world. It is estimated that the present world consumption of concrete is 11 billion metric tons per year. (Concrete, Microstructure, Properties and Materials (2006, McGraw-Hill)). Concrete is a term that refers to a composite material of a binding medium having particles or fragments of aggregate embedded therein. In most construction concretes currently employed, the binding medium is formed from a mixture of a hydraulic cement and water.

Most hydraulic cements employed today are based upon Portland cement. Portland cement is made primarily from limestone, certain clay minerals, and gypsum, in a high temperature process that drives off carbon dioxide and chemically combines the primary ingredients into new compounds. The energy required to fire the mixture consumes about 4 GJ per ton of cement produced.

Because carbon dioxide is generated by both the cement production process itself, as well as by energy plants that generate power to run the production process, cement production is currently a leading source of current carbon dioxide atmospheric emissions. It is estimated that cement plants account for 5% of global emissions of carbon dioxide. As global warming and ocean acidification become an increasing problem and the desire to reduce carbon dioxide gas emissions (a principal cause of global warming) continues, the cement production industry will fall under increased scrutiny.

Fossil fuels that are employed in cement plants include coal, natural gas, oil, used tires, municipal waste, petroleum coke and biofuels. Fuels are also derived from tar sands, oil shale, coal liquids, and coal gasification and biofuels that are made via syngas. Cement plants are a major source of $CO_2$ emissions, from both the burning of fossil fuels and the $CO_2$ released from the calcination which changes the limestone, shale and other ingredients to Portland cement. Cement plants also produce wasted heat. Additionally, cement plants produce other pollutants like NOx, SOx, VOCs, particulates and mercury. Cement plants also produce cement kiln dust (CKD), which must sometimes be land filled, often in hazardous materials landfill sites.

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0. $CO_2$ monitoring has shown atmospheric $CO_2$ has risen from approximately 280 parts per million (ppm) in the 1950s to approximately 380 ppm today, and is expect to exceed 400 ppm in the next decade. The impact of climate change will likely be economically expensive and environmentally hazardous. Reducing potential risks of climate change will require sequestration of $CO_2$.

SUMMARY

In some embodiments, the invention provides a method comprising a) producing a synthetic carbonate component from a divalent cation-containing solution and an industrial waste gas comprising $CO_2$ and b) incorporating the synthetic carbonate component into a reduced-carbon footprint concrete composition, wherein the reduced-carbon footprint concrete composition has a reduced carbon footprint relative to an ordinary concrete composition. In some embodiments, the reduced-carbon footprint concrete composition has a smaller carbon footprint relative to an ordinary concrete composition. In some embodiments, the reduced-carbon footprint concrete composition has less than 75% of the carbon footprint as the ordinary concrete composition. In some embodiments, the reduced-carbon footprint concrete composition has less than 50% of the carbon footprint as the ordinary concrete composition. In some embodiments, the reduced-carbon footprint concrete composition has less than 25% of the carbon footprint as the ordinary concrete composition. In some embodiments, the reduced-carbon footprint concrete composition has a neutral carbon footprint. In some embodiments, the reduced-carbon footprint concrete composition has a negative carbon footprint. In some embodiments, the carbon footprint of the reduced-carbon footprint concrete composition results from both carbon dioxide that is sequestered and carbon dioxide that is avoided. In some embodiments, the negative carbon footprint is less than 0 lbs $CO_2/yd^3$ of the reduced concrete composition. In some embodiments, the negative carbon footprint is less than 250 lbs $CO_2/yd^3$ of the reduced concrete composition. In some embodiments, the negative carbon footprint is less than 500 lbs $CO_2/yd^3$ of the reduced concrete composition. In some embodiments, the negative carbon footprint is less than 1000 lbs $CO_2/yd^3$ of the reduced concrete composition. In some embodiments, the synthetic carbonate component is supplementary cementitious material, fine aggregate, coarse aggregate, or reactive pozzolanic material. In some embodiments, the synthetic carbonate component is aragonite, nesquehonite, hydromagnesite, monohydrocalcite, or a combination thereof. In some embodiments, the synthetic carbonate component is a combination of aragonite and hydromagnesite. In some embodiments, the synthetic carbonate component is a combination of aragonite and nesquehonite. In some embodiments, the synthetic carbonate component is a combination of nesquehonite and monohydrocalcite. In some embodiments, the synthetic carbonate component has a $\delta^{13}C$ less than −10‰. In some embodiments, the synthetic carbonate component has a $\delta^{13}C$ less than −20‰. In some embodiments, the synthetic carbonate component has a $\delta^{13}C$ less than −30‰.

In some embodiments, the invention provides a reduced-carbon footprint composition produced by a method comprising a) producing a synthetic carbonate component from a divalent cation-containing solution and an industrial waste gas comprising $CO_2$ and b) incorporating the synthetic carbonate component into a reduced-carbon footprint concrete composition, wherein the reduced-carbon footprint concrete composition has a reduced carbon footprint relative to an ordinary concrete composition.

In some embodiments, the invention provides a composition comprising between 2.5% and 50% calcium; between 2.5% and 50% magnesium; and at least 25% carbonates, bicarbonates, or a mixture thereof. In some embodiments, the composition comprises between 2.5% and 25% calcium. In some embodiments, the composition comprises between 5% and 10% calcium. In some embodiments, the composition comprises between 5% and 30% magnesium. In some embodiments, the composition comprises between 10% and 30% magnesium. In some embodiments, the composition comprises at least 50% carbonates, bicarbonates, or a mixture thereof. In some embodiments, the composition comprises at least 75% carbonates, bicarbonates, or a mixture thereof. In some embodiments, the composition comprises aragonite, nesquehonite, hydromagnesite, monohydrocalcite, or a combination thereof. In some embodiments, the composition comprises a combination of aragonite and hydromagnesite. In some embodiments, the composition comprises a combination of aragonite and nesquehonite. In some embodiments, the composition comprises a combination of nesquehonite and monohydrocalcite.

In some embodiments, the invention provides a reduced-carbon footprint concrete composition comprising a $CO_2$-sequestering component. The $CO_2$-sequestering component may be a supplementary cementitious material or an aggregate such as a coarse aggregate or a fine aggregate. In some embodiments, the reduced-carbon footprint concrete composition comprises a $CO_2$-sequestering supplementary cementitious material and a $CO_2$-sequestering aggregate. In some embodiments, the reduced-carbon footprint concrete composition comprises a Portland cement clinker.

In some embodiments, the invention provides a settable composition comprising water and a reduced-carbon footprint concrete composition comprising a $CO_2$-sequestering component. The $CO_2$-sequestering component may be a supplementary cementitious material or an aggregate such as a coarse aggregate or a fine aggregate. In some embodiments, the reduced-carbon footprint concrete composition comprises a $CO_2$-sequestering supplementary cementitious material and a $CO_2$-sequestering aggregate. In some embodiments, the reduced-carbon footprint concrete composition comprises a Portland cement clinker.

In some embodiments, the invention provides a method of making a concrete, the method comprising combining a hydraulic cement with a $CO_2$-sequestering component. The $CO_2$-sequestering component may be a supplementary cementitious material or an aggregate such as a coarse aggregate or a fine aggregate. In some embodiments, the reduced-carbon footprint concrete composition comprises a $CO_2$-sequestering supplementary cementitious material and a $CO_2$-sequestering aggregate. In some embodiments, the reduced-carbon footprint concrete composition comprises a Portland cement clinker.

In some embodiments, the invention provides a method of combining water with a reduced-carbon footprint concrete composition comprising a $CO_2$-sequestering component to produce a hydrated concrete composition and allowing the hydrated concrete composition to set into a solid product. The $CO_2$-sequestering component may be a supplementary cementitious material or an aggregate such as a coarse aggregate or a fine aggregate. In some embodiments, the reduced-carbon footprint concrete composition comprises a $CO_2$-sequestering supplementary cementitious material and a $CO_2$-sequestering aggregate. In some embodiments, the reduced-carbon footprint concrete composition comprises a Portland cement clinker. In some embodiments, the solid product a structural product.

DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

FIG. 1 provides a method of the invention for producing precipitation material.

Figure 2:
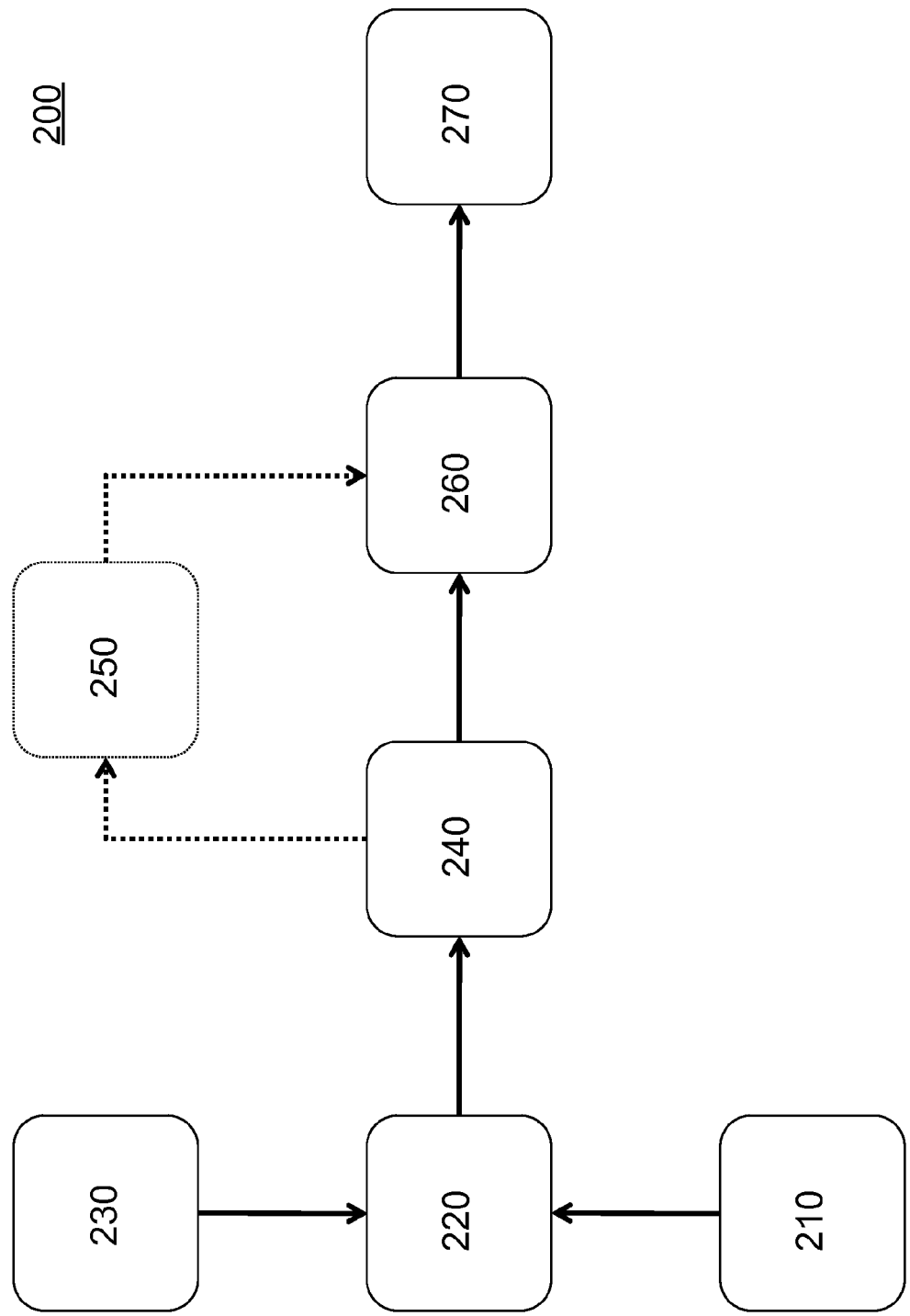

FIG. 2 illustrates a system of the invention for producing a precipitation material.

Figure 3:
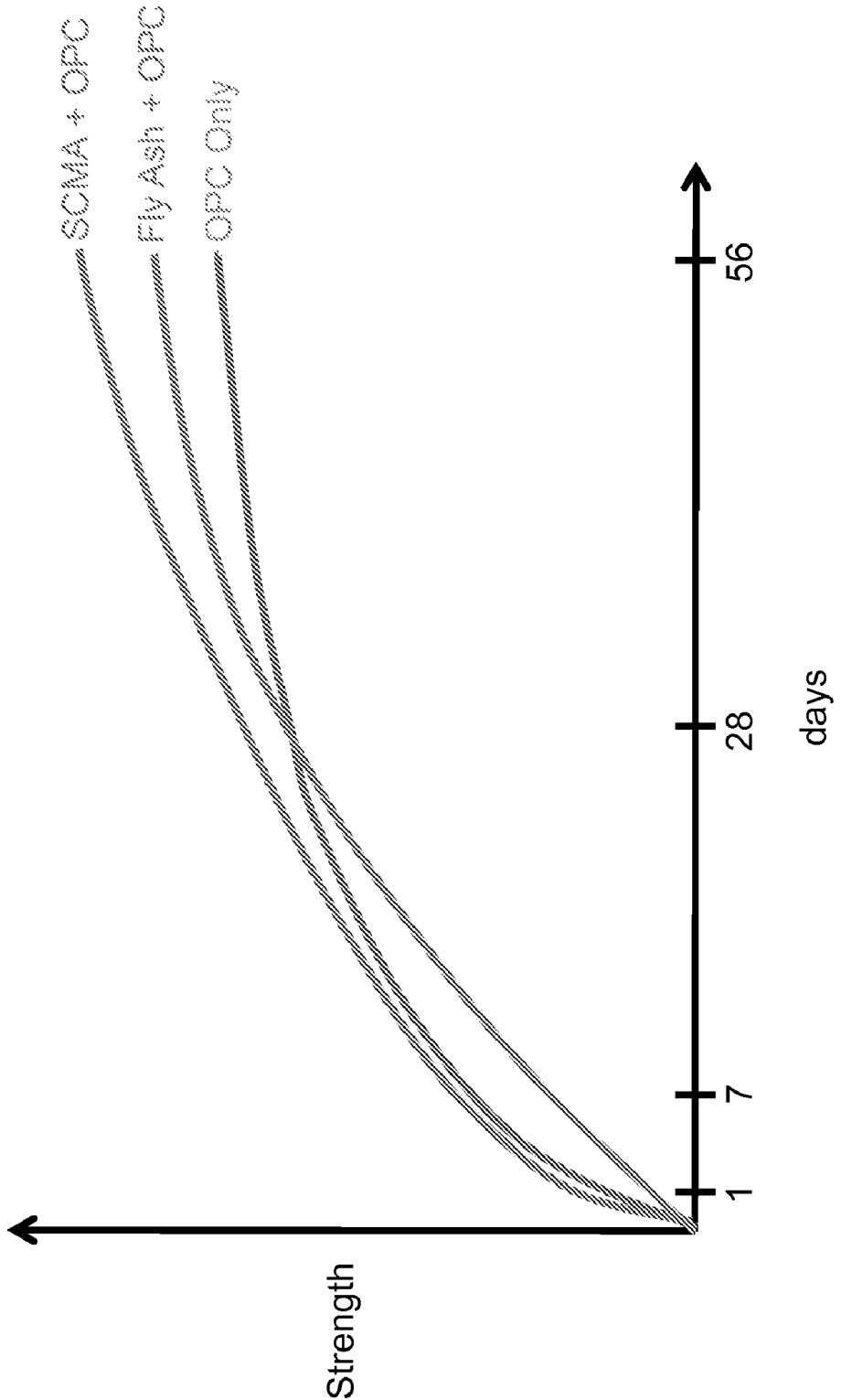

FIG. 3 provides a plot of strength vs. days for a composition of the invention.

Figure 4:
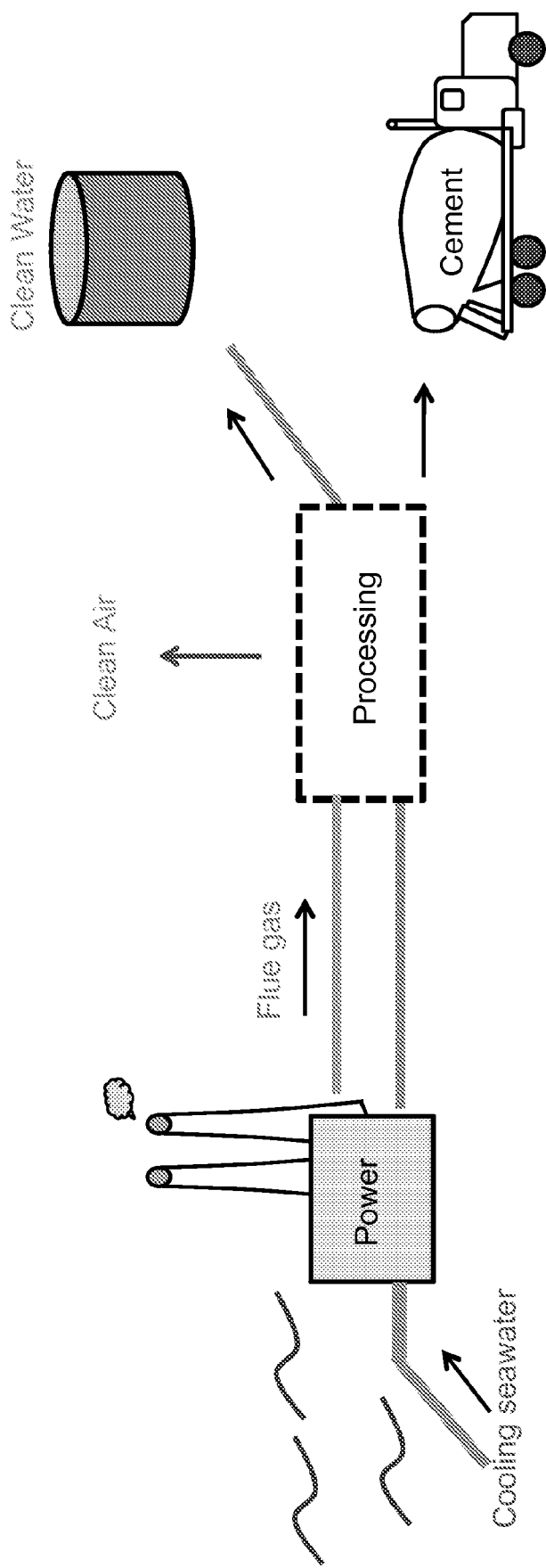

FIG. 4 illustrates production of a precipitation material and/or cement of the invention.

Figure 5:
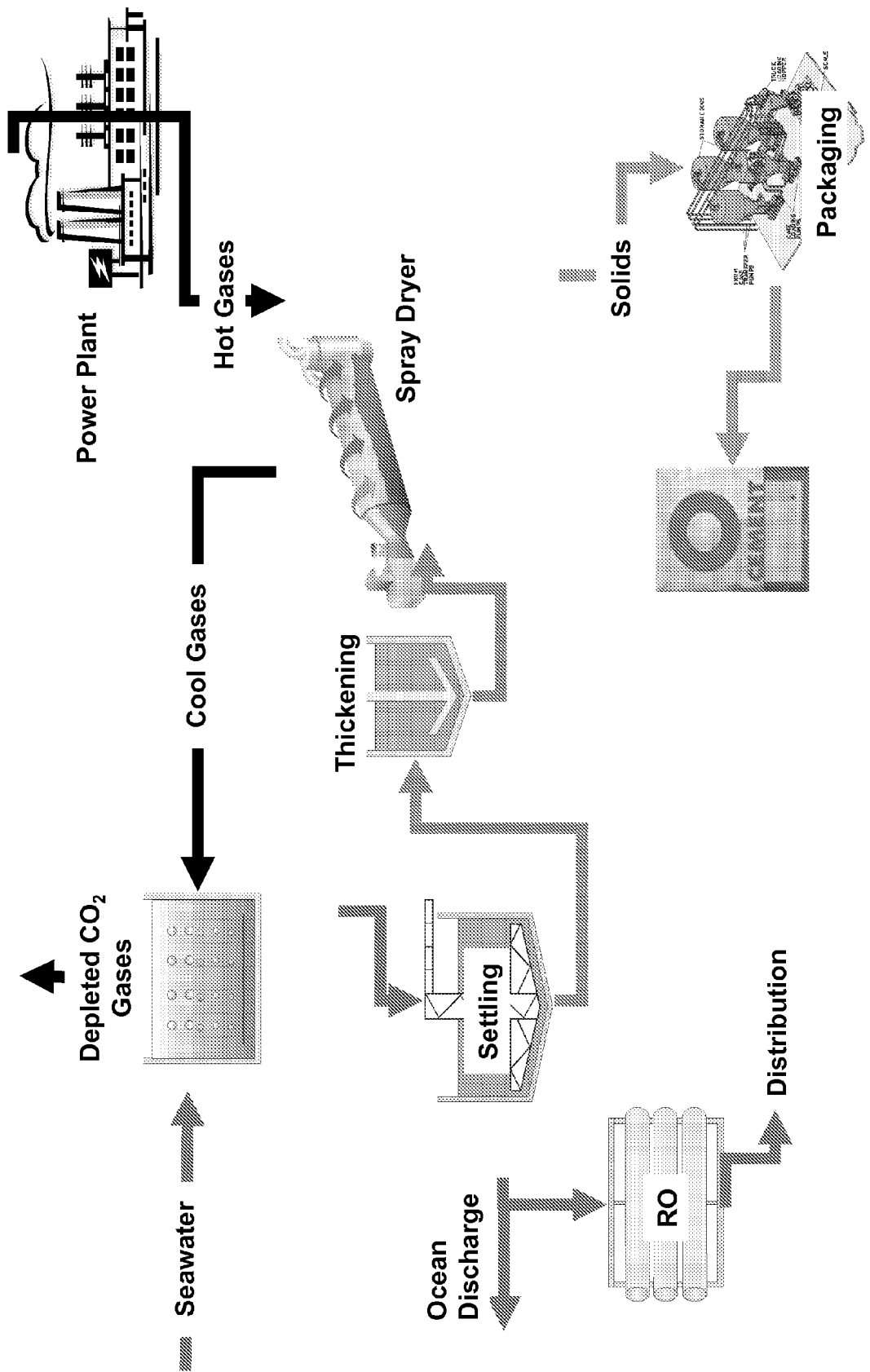

FIG. 5 provides a system of the invention for producing a precipitation material and/or cement.

Figure 6:
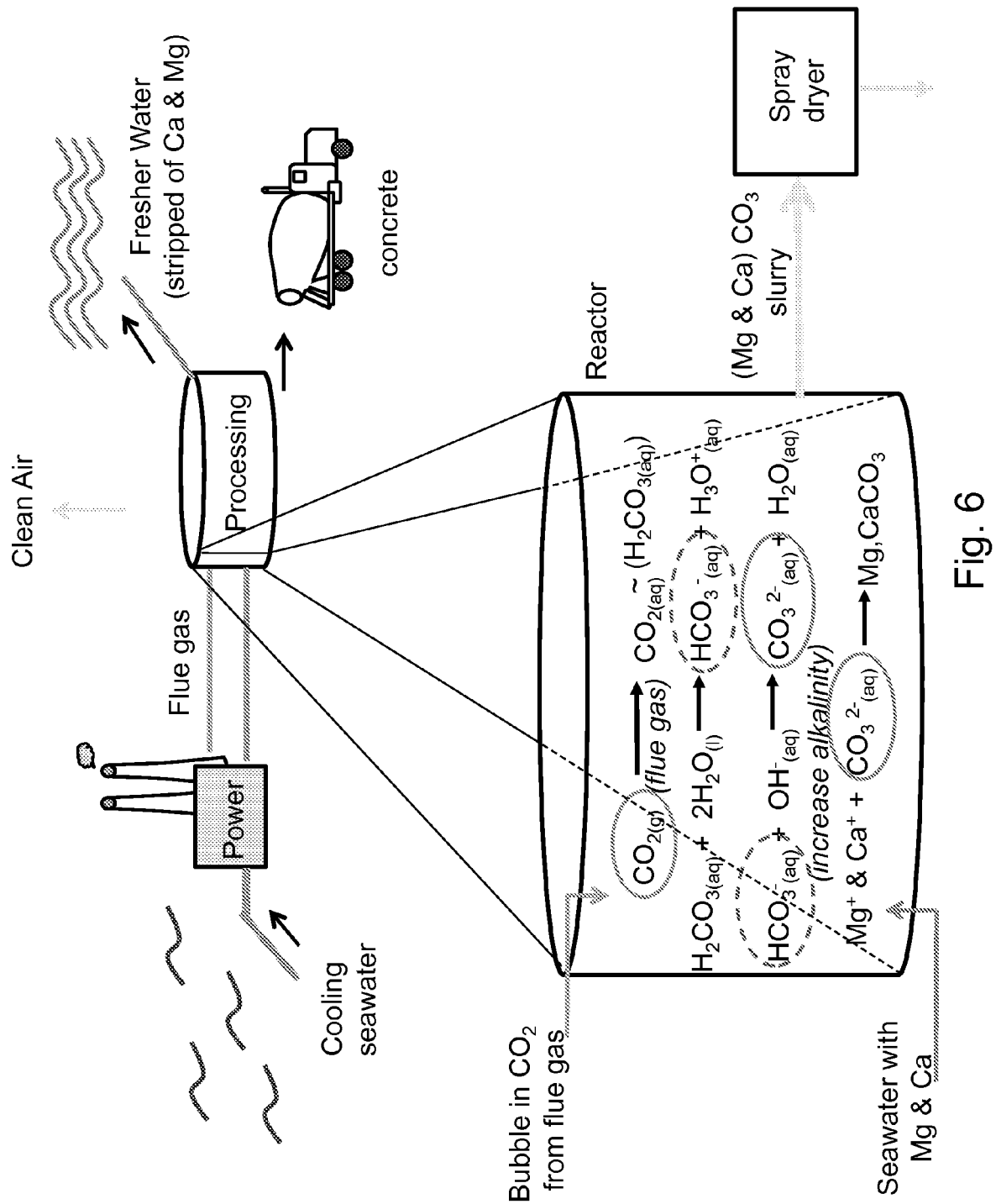

FIG. 6 illustrates production of a precipitation material, cement, and/or concrete of the invention from power plant flue gas comprising $CO_2$.

Figure 7:
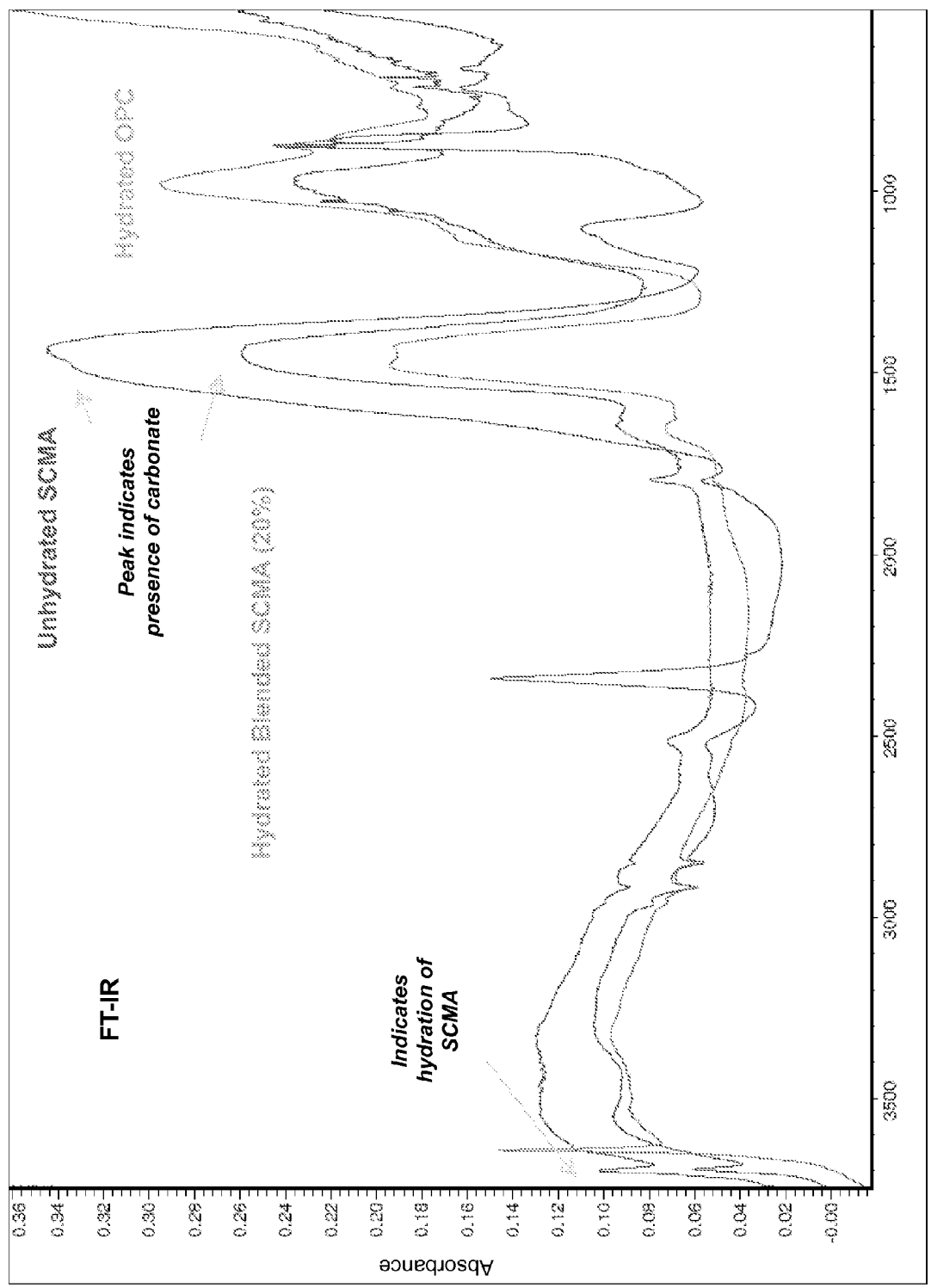

FIG. 7 provides an Fourier transform-infrared (FT-IR) plot for ordinary Portland cement (OPC), unhydrated supplementary cementitious admixture (SCMA), and a hydrated blend comprising 20% SCMA and 80% OPC at 7 days.

Figure 8:
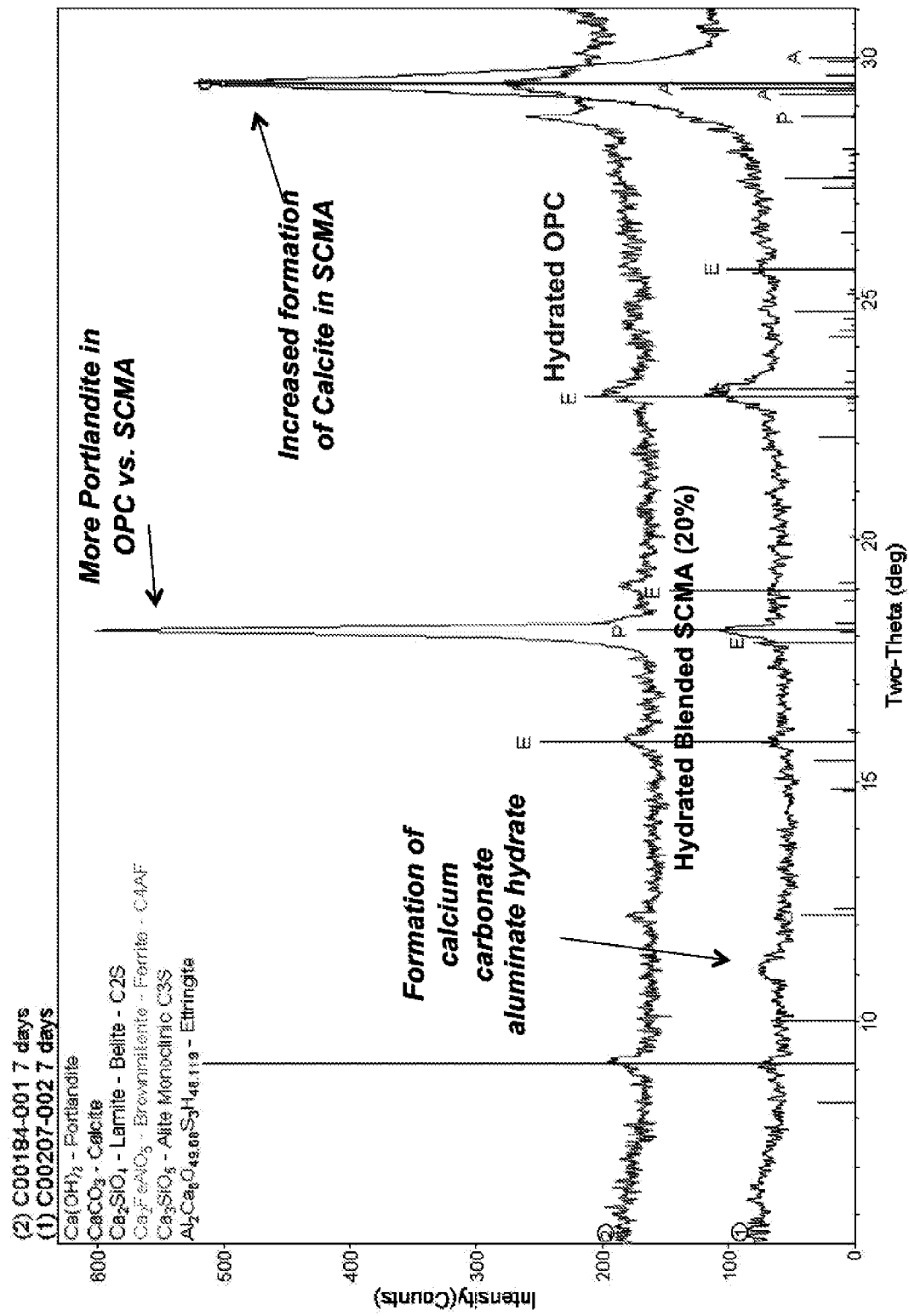

FIG. 8 provides an X-ray diffractogram (XRD) for OPC and a hydrated blend comprising 20% SCMA and 80% OPC at 7 days.

Figure 9:
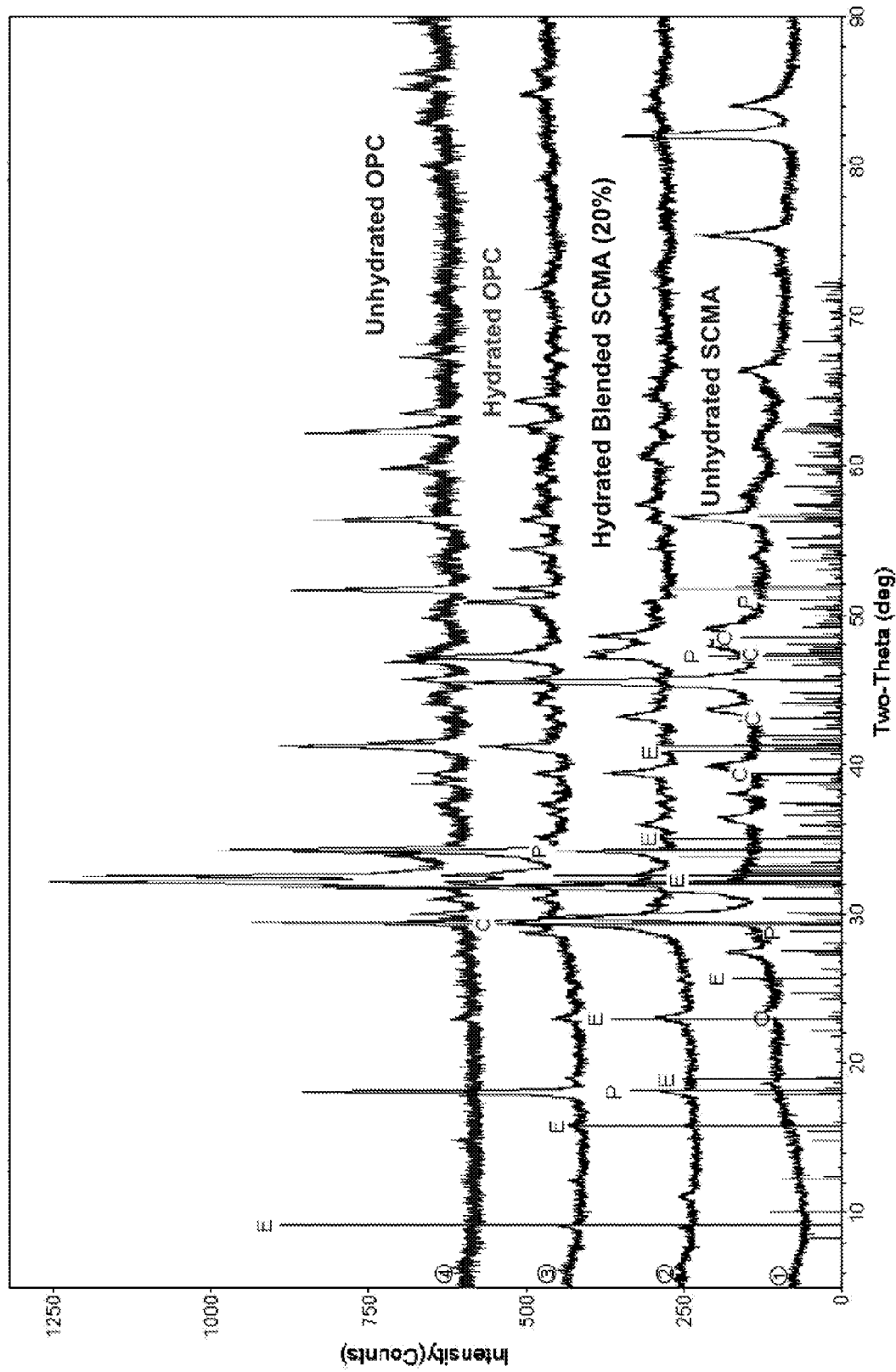

FIG. 9 provides an X-ray diffractogram (XRD) for hydrated OPC, unhydrated OPC, unhydrated SCMA, and a hydrated blend comprising 20% SCMA and 80% OPC.

Figure 10:
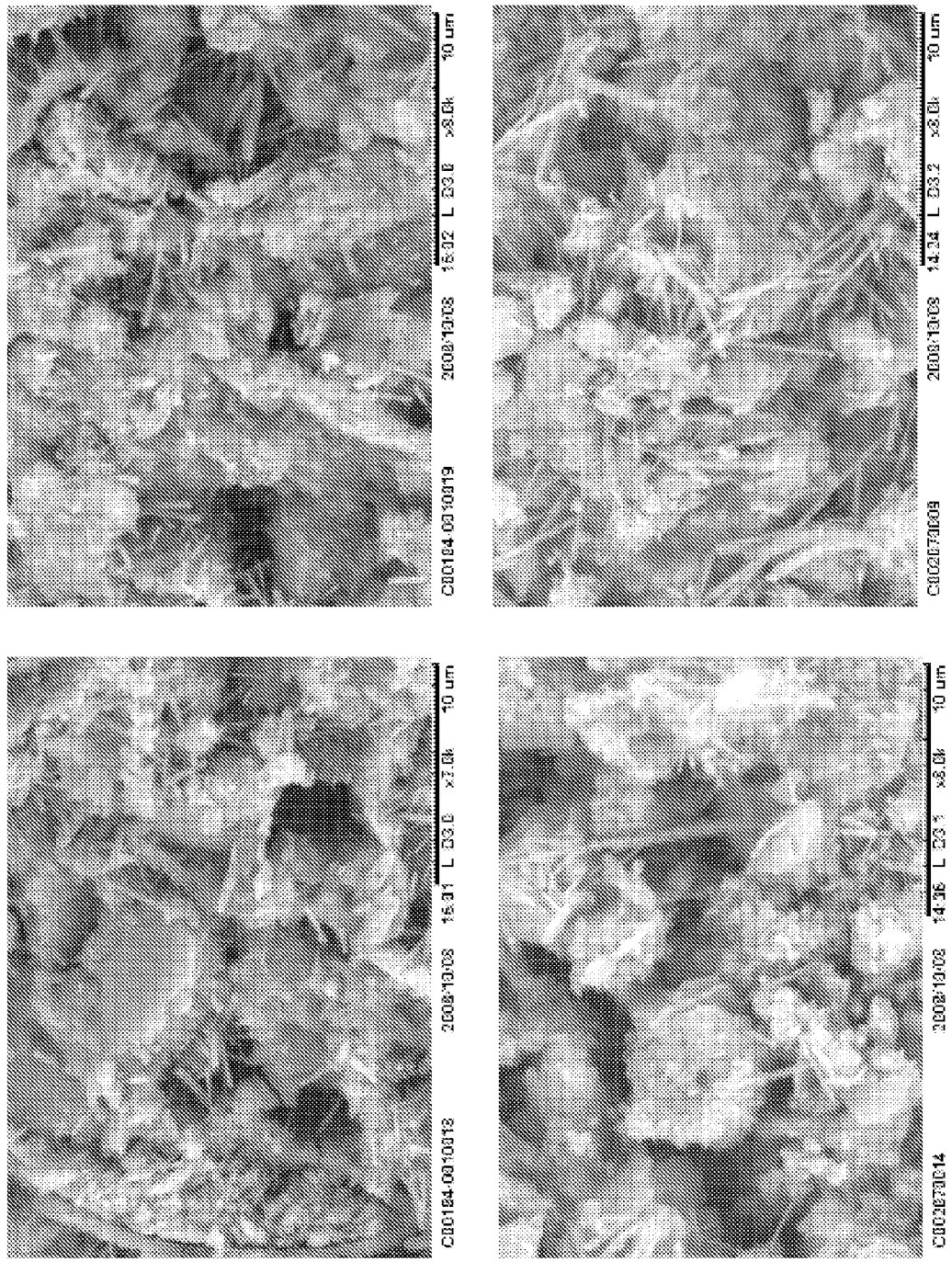

FIG. 10 provides scanning electron microscopy (SEM) images for hydrated OPC and a hydrated blend comprising 20% SCMA and 80% OPC.

FIG. 11 indicates SCMA of the invention is reactive.

FIG. 12 provides different morphologies for supplementary cementitious material of the invention.

DESCRIPTION

In some embodiments, the invention provides reduced-carbon footprint concrete compositions. The reduced-carbon footprint concrete of the invention include a component (e.g., a $CO_2$-sequestering component), which comprises carbonates, bicarbonates, or a combination thereof. Additional aspects of the invention include methods of making and using the reduced-carbon footprint concrete.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In further describing the invention, the reduced-carbon footprint concrete compositions, as well as methods and systems for their production, will be described first in greater detail. Next, methods of using the reduced-carbon footprint concrete compositions will be reviewed further.

Reduced-Carbon Footprint Concrete Compositions

In some embodiments, the invention provides reduced-carbon footprint concrete compositions. Reduced-carbon footprint concrete compositions are concrete compositions that may include, for example, an ordinary Portland cement (OPC) component but have a reduced carbon footprint as compared to a concrete that only includes, for example, OPC as the cement component. In some embodiments, the reduced-carbon footprint concrete compositions comprise carbon derived from a fuel used by humans (e.g., a fossil fuel). For example, reduced-carbon footprint concrete compositions according to aspects of the invention comprise carbon that was released in the form of $CO_2$ from combustion of a fossil fuel. In certain embodiments, the carbon sequestered in a composition of the invention (e.g., a reduced-carbon footprint concrete composition) comprises a carbonate, bicarbonate, or a mixture thereof. Therefore, in certain embodiments, reduced-carbon footprint concrete compositions according to aspects of the subject invention contain carbonates, wherein at least a portion of the carbon in the carbonates may be derived from a fuel used by humans (e.g., a fossil fuel). As such, production of reduced-carbon footprint concrete compositions of the invention results in the placement of $CO_2$ into storage-stable forms that may be used as, for example, components of the built environment, which environment comprises man-made structures such as buildings, walls, roads, etc. As such, production of reduced-carbon footprint concrete compositions of the invention results in the prevention of $CO_2$ gas from entering the atmosphere.

With respect to calculation of carbon footprint, the carbon footprint of concrete may be determined by multiplying the pounds per cubic yard of each constituent by its per pound carbon footprint, summing these values, and adding 10.560 kg/yd$^3$ (the carbon footprint of transporting one yard of concrete 20 miles on average). With respect to the OPC component, assuming an average $CO_2$ release from Portland cement production of 0.86 tonnes $CO_2$/tonne cement (as reported for California Cement Climate Action Team), each pound of Portland cement has a production carbon footprint of 0.86 pounds. Assuming an average transportation distance of 100 miles, the transportation footprint for each pound of Portland cement is 0.016 pounds, for a total carbon footprint of 0.876 pounds $CO_2$ per pound of OPC. For purposes of carbon footprint calculation, conventional aggregate may be assumed to have a carbon footprint of 0.043 lbs $CO_2$/lb aggregate, while carbon footprint of conventional supplementary cementitious materials (SCMs), e.g., fly ash, slag, etc., may be assumed to be 0.045 lbs $CO_2$/lb conventional SCM. Compared to reference concrete comprising conventional aggregate (e.g., sand and/or rock) and OPC as the only cement component, the magnitude of the carbon footprint reduction of the reduced-carbon footprint concrete compositions of the invention may be equal to or more than 25 lbs $CO_2$/yd$^3$ concrete, 50 lbs $CO_2$/yd$^3$ concrete, 100 lbs $CO_2$/yd$^3$ concrete, more than 200 lbs $CO_2$/yd$^3$ concrete, more than 300 lbs $CO_2$/yd$^3$ concrete, more than 400 lbs $CO_2$/yd$^3$ concrete, or more than 500 lbs $CO_2$/yd$^3$ concrete. For example, a reduced-carbon footprint concrete composition comprising OPC, 20% $CO_2$-sequestering SCM (e.g., SCM comprising carbonated, bicarbonates, or a combination thereof), and 20% fly ash may exhibit a carbon footprint reduction of about 250 lbs $CO_2/yd^3$ concrete, such as a reduction of 244 lbs $CO_2/yd^3$ concrete. Such a reduced-carbon footprint concrete composition exhibits nearly half the carbon footprint of a convention concrete composition.

These reductions in carbon footprint may be achieved with concrete mixes that include less than 50% by weight conventional SCMs, such as less than 40% by weight conventional SCMs, including less than 30% by weight conventional SCMs, for example, less than 20% SCMs. The term "hydraulic cement" is employed in its conventional sense to refer to a composition which sets and hardens after combining with water or a solution where the solvent is water, e.g., an admixture solution. Setting and hardening of the product produced by combination of the cements of the invention with an aqueous liquid results from the production of hydrates that are formed from the cement upon reaction with water, where the hydrates are essentially insoluble in water.

In certain embodiments, reduced-carbon footprint concrete compositions of the invention are carbon neutral in that they have substantially no carbon footprint (if any) as determined using, for example, the calculation guidelines provided above. Carbon neutral concrete compositions of the invention include those compositions that exhibit a carbon footprint of less than 50 lbs $CO_2/yd^3$ concrete, such as less than 25 lbs $CO_2/yd^3$ concrete, including less than 10 lbs $CO_2/yd^3$ concrete, for example, less than 5 lbs $CO_2/yd^3$ concrete. In some embodiments, the carbon neutral concrete compositions exhibit a carbon footprint of 0 $CO_2/yd^3$ concrete or less, such as a negative carbon footprint of less than (i.e., more negative than) $-1$ lbs $CO_2/yd^3$ concrete, less than $-2$ lbs $CO_2/yd^3$ concrete, less than $-3$ lbs $CO_2/yd^3$ concrete, less than $-4$ lbs $CO_2/yd^3$ concrete, or less than $-5$ lbs $CO_2/yd^3$ concrete. For example, a concrete composition comprising OPC and mostly fine synthetic aggregate (i.e., $CO_2$-sequestering aggregate, which comprises carbonates, bicarbonates, or a mixture thereof) may exhibit a carbon footprint reduction of more than 500 lbs $CO_2/yd^3$ concrete (e.g., 537 lbs $CO_2/yd^3$ concrete) such that the concrete composition may be considered carbon neutral. Such a carbon neutral concrete composition may be made to have a more negative carbon footprint by displacement (also "avoidance") of, for example, a portion of OPC. For example, a concrete composition comprising 60% OPC, 20% fly ash, 20% $CO_2$-sequestering SCM (e.g., SCM comprising carbonates, bicarbonates, or a mixture thereof), and a portion of fine aggregate replaced with fine synthetic aggregate (i.e., $CO_2$-sequestering aggregate, which comprises carbonates, bicarbonates, or a mixture thereof) may exhibit a carbon neutral footprint or a significantly negative carbon footprint.

In some embodiments, as above, small-carbon footprint concretes have a significantly negative carbon footprint. In such embodiments, the negative carbon footprint of the composition may be less than (i.e., more negative than) $-10$, $-25$, $-50$, $-100$, $-250$, $-500$, $-750$, or $-1000$ lbs concrete. For example, a concrete composition comprising OPC, 20% $CO_2$-sequestering SCM (e.g., SCM comprising carbonates, bicarbonates, or a mixture thereof), 100% fine synthetic aggregate (i.e., the only fine synthetic aggregate is fine $CO_2$-sequestering aggregate, which comprises carbonates, bicarbonates, or a mixture thereof), 100% coarse synthetic aggregate (i.e., the only coarse synthetic aggregate is coarse $CO_2$-sequestering aggregate, which comprises carbonates, bicarbonates, or a mixture thereof) may exhibit a significantly negative carbon footprint of less than $-1000$ lbs $CO_2/yd^3$ concrete, for example, 1146 lbs $CO_2/yd^3$ concrete. Such concrete compositions, by virtue of displacing and thereby avoiding $CO_2$-producing components such as OPC may exhibit an even greater carbon footprint reduction (i.e., an even more significantly negative carbon footprint). As such, concrete compositions comprising a $CO_2$-sequestering component (e.g., a component comprising carbonates, bicarbonates, or a mixture thereof) in place of a $CO_2$-producing component may exhibit a significantly negative carbon footprint reflecting a net avoidance of $CO_2$, wherein the carbon footprint of the concrete compositions may be less than (i.e., more negative than) $-1000$ lbs $CO_2/yd^3$ concrete, such as $-1250$ lbs $CO_2/yd^3$ concrete, including $-1500$ lbs $CO_2/yd^3$ concrete, for example, $-1750$ lbs $CO_2/yd^3$ concrete or less. For example, a concrete composition comprising OPC, 20% $CO_2$-sequestering SCM (e.g., SCM comprising carbonates, bicarbonates, or a mixture thereof), 100% fine $CO_2$-sequestering aggregate (i.e., the only fine aggregate is fine $CO_2$-sequestering aggregate, which comprises carbonates, bicarbonates, or a mixture thereof), 100% coarse $CO_2$-sequestering aggregate (i.e., the only coarse aggregate is coarse $CO_2$-sequestering aggregate, which comprises carbonates, bicarbonates, or a mixture thereof) may exhibit a significantly negative carbon footprint resulting from a net avoidance of $CO_2$, wherein the negative carbon footprint may be, for example, 1683 lbs $CO_2/yd^3$ concrete.

Reduced-carbon footprint concrete compositions of the invention may be characterized by including, in some embodiments, a cement component and an aggregate component. The cement component includes some portion of a conventional hydraulic cement, such as OPC, and may or may not include one or more conventional SCMs, e.g., fly ash, slag, etc. The aggregate component includes fine and/or coarse aggregates. Aspects of the concrete compositions include the presence of a $CO_2$-sequestering component (e.g., a component comprising carbonates, bicarbonates, or a mixture thereof), such as a $CO_2$-sequestering SCM and/or a $CO_2$-sequestering aggregate, either fine or coarse. Each of these components is now reviewed separately in greater detail.

A substantial reduction in carbon footprint may result from using reduced-carbon footprint concrete compositions of the invention. For example, a substantial carbon reduction may result from combining both a cement credit (i.e., the $CO_2$ avoided) from offsetting the use of ordinary Portland cement and the quantity of sequestered carbon from fossil point sources. Each ton of material comprising a carbonate/bicarbonate component (e.g., $CO_2$-sequestering component) of the invention may result in a $CO_2$ reduction of up to 1 ton or more, such as 1.2 tons or more, including 1.6 tons or more, for example 2 tons or more of $CO_2$. Various binary, ternary, quaternary, etc. blends comprising a carbonate/bicarbonate (e.g., $CO_2$-sequestering component) of the invention may result in such reductions. The carbonate/bicarbonate component (e.g., $CO_2$-sequestering component) may be employed as, for example, supplementary cementitious material (SCM) in conjunction with fly ash, slag, and/or ordinary Portland cement to produce a blended cement with a small, neutral (i.e., approximately zero), or negative carbon footprint. Such blended cement may also have a compressive strength at or above 1,000 psi, including at or above 2,000 psi, e.g., at or above, 2,500 psi in 28 days or less, e.g., 14 days or less. As such, a blended cement of the invention with a small, neutral, or negative carbon footprint may produce quality concrete suitable for use in concrete pavement applications.

Reduced-carbon footprint concrete compositions comprise small-, neutral-, or negative-carbon footprint concrete compositions. In some embodiments, small-, neutral-, or negative-carbon footprint concrete compositions comprise a blended cement (e.g., $CO_2$-sequestering supplementary cementitious material (SCM) in conjunction with fly ash, slag, and/or Portland cement) and a $CO_2$-sequestering aggregate (e.g., the aggregate being coarse aggregate; fine aggregate such as sand; etc.), which aggregate may be prepared from a carbonate/bicarbonate component (e.g., $CO_2$-sequestering component) of the invention in accordance with U.S. patent application Ser. No. 12/475,378, filed 29 May 2009, which is incorporated herein by reference. Such compositions may include, for example, a fine aggregate (e.g., sand) that has a sequestered $CO_2$ content of approximately 20% or more, e.g., 35% or more, including 50% or more. In some embodiments, the compressive strength of the small-, neutral-, or negative-carbon concrete compositions may be 2,500 psi or more at 28 days, e.g., 3000 psi or more, including 4,000 psi at 28 days. Some embodiments provide a negative-carbon footprint concrete composition, which exhibits compressive strengths of 4,000 psi at 28 days. Equal early strengths (i.e., at 28 days) allow for the use of small-, neutral-, or negative-carbon footprint concrete compositions without negatively affecting construction schedules.

In some embodiments, the invention provides small-, neutral-, or negative-carbon footprint concrete compositions, which not only meet strength and early strength criteria, but also finishes like normal concrete compositions. Blended cement-concrete compositions of the invention behave in a fashion similar to conventional OPC-concrete compositions enabling the invention to be used in similar places and for similar functions. In some embodiments, blended cement-concrete compositions may be used in the invention. In some embodiments, blended cement-concrete compositions of the invention may be used. For example, blended cement-concrete compositions may be placed into parking areas (e.g. a 5,000 square foot parking lot). Blended cement-concrete compositions, due to the higher albedo of such compositions, reduce carbon emissions via reduced lighting demands. This reduction of carbon emissions may occur over the lifetime of the blended cement-concrete compositions. For example, albedo and luminance measurements of parking areas comprising small-, neutral-, or negative-carbon footprint concrete compositions compared to asphalt parking areas may be used to determine the difference in lighting needed and, thus, the level of carbon reduction that may be possible due to the use of higher albedo concrete compositions of the invention. Albedo tests of such compositions demonstrate urban heat island reduction abilities, e.g., by 2-fold or more, 5-fold or more, 10-fold or more, 20-fold or more.

Conventional Hydraulic Cement

One component of the compositions of the invention may be a conventional hydraulic cement. Conventional hydraulic cements are any cements that are not $CO_2$-sequestering cements (e.g., a cement comprising synthetic carbonates, synthetic bicarbonates, or a mixture thereof), e.g., as reviewed in greater detail below. Of interest in certain embodiments as the conventional hydraulic cement is Portland cement. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). As defined by the European Standard EN197.1, Portland cement clinker is a hydraulic material which shall consist of at least two-thirds by mass of calcium silicates (3 $CaO.SiO_2$ and 2 $CaO.SiO_2$), the remainder consisting of aluminum- and iron-containing clinker phases and other compounds. The ratio of CaO to $SiO_2$ shall not be less than 2.0. The magnesium content (MgO) shall not exceed 5.0% by mass." In certain embodiments, the Portland cement constituent of the present invention may be any Portland cement that satisfies the ASTM Standards and Specifications of C150 (Types I-VIII) of the American Society for Testing of Materials (ASTM C50-Standard Specification for Portland Cement). ASTM C150 covers eight types of Portland cement, each possessing different properties, and used specifically for those properties.

In a given concrete composition of the invention, the amount of Portland cement component may vary. In certain embodiments, the amount of Portland cement in the blend ranges from 10 to 90% (w/w), such as 30 to 70% (w/w) and including 40 to 60% (w/w), e.g., a blend of 80% OPC and 20% $CO_2$-sequestering SCM (e.g., SCM comprising carbonates, bicarbonates, or a mixture thereof) of the invention.

Conventional SCMs

The cements may further include one or more supplementary cementitious compositions, such as fly ash, slag, etc. In certain embodiments, the cements may be blends, in that they include not only the carbonate compound composition component but also one or more additional components that may be added to modify the properties of the cement, e.g., to provide desired strength attainment, to provide desired setting times, etc. Components of interest that may be present in blended cements of the invention include, but are not limited to: blast furnace slag, fly ash, diatomaceous earth, natural or artificial pozzolans, silica fumes, limestone, gypsum, hydrated lime, etc. The amount of such components present in a given concrete composition of the invention (if present at all) may vary, and in certain embodiments the amounts of these components range from 1 to 50% w/w, such as 2 to 25% w/w, including 10 to 20% w/w.

$CO_2$-Sequestering Component $CO_2$-sequestering materials (also "carbon-sequestering materials") of the invention include materials that contain carbonates and/or bicarbonates, which may be in combination with a divalent cation such as calcium and/or magnesium, or with a monovalent cation such as sodium. The carbonates and/or bicarbonates may be in solution, in solid form, or a combination of solution and solid form (e.g., a slurry). The carbonates and/or bicarbonates may contain carbon dioxide from a source of carbon dioxide; in some embodiments, the carbon dioxide originates from the burning of fossil fuel, and thus, some (e.g., at least 10, 50, 60, 70, 80, 90, 95%) or substantially all (e.g., at least 99, 99.5, or 99.9%) of the carbon in the carbonates and/or bicarbonates is of fossil fuel origin (i.e., of plant origin). As is known, carbon of plant origin has a different ratio of stable isotopes ($^{13}C$ and $^{12}C$) than carbon of inorganic origin, and thus the carbon in the carbonates and/or bicarbonates, in some embodiments, has a $\delta^{13}C$ value of less than, e.g., −10‰, or less than −15‰, or less than −20‰, or less than −35‰, or less than −30‰, or less than −35‰.

As summarized above, $CO_2$-sequestering components include both supplementary cementitious materials and aggregates, both fine and coarse, where the $CO_2$-sequestering components stably store a significant amount of $CO_2$ in the form of carbonates, bicarbonates, or a mixture thereof. Reduced-carbon footprint concrete compositions of the invention include a carbonate/bicarbonate component (e.g., $CO_2$-sequestering component). Such components store a significant amount of $CO_2$ in a storage-stable format, such that $CO_2$ gas may not be readily produced from the product and released into the atmosphere. In certain embodiments, the carbonate/bicarbonate components (e.g., $CO_2$-sequestering components) can store 50 tons or more of $CO_2$, such as 100 tons or more of $CO_2$, including 250 tons or more of $CO_2$, for instance 500 tons or more of $CO_2$, such as 750 tons or more of $CO_2$, including 900 tons or more of $CO_2$ for every 1000 tons of reduced-carbon footprint concrete composition of the invention. In certain embodiments, the carbonate/bicarbonate components (e.g., $CO_2$-sequestering components comprises) of the reduced-carbon footprint concrete compositions comprise about 5% or more of $CO_2$, such as about 10% or more of $CO_2$, including about 25% or more of $CO_2$, for instance about 50% or more of $CO_2$, such as about 75% or more of $CO_2$, including about 90% or more of $CO_2$ (e.g., present as one or more carbonate compounds).

The carbonate/bicarbonate components (e.g., $CO_2$-sequestering components) of the invention may include one or more carbonate compounds. The amount of carbonate in the carbonate/bicarbonate component (e.g., $CO_2$-sequestering component), as determined by, for example, coulometry using the protocol described in coulometric titration, may be 40% or higher, such as 70% or higher, including 80% or higher. In some embodiments, where the Mg source is a mafic mineral (described in U.S. patent application Ser. No. 12/501,217, filed 10 Jul. 2009, and U.S. Provisional Patent Application No. 61/079,790, filed 10 Jul. 2008, each of which is incorporated herein by reference) or an ash (described in U.S. patent application Ser. No. 12/486,692, filed 17 Jun. 2009, and U.S. Provisional Application No. 61/073,319, filed 17 Jun. 2008, each of which is incorporated herein by reference), the resultant product may be a composition containing silica as well as carbonate. In these embodiments, the carbonate content of the product may be as low as 10%. In some of these embodiments, the silica content of the product may provide improved performance as a cement or supplementary cementitious material.

The $CO_2$-sequestering component (e.g., precipitation material comprising carbonates, bicarbonates, or a mixture thereof) of reduced-carbon footprint concrete compositions of the invention provides for long-term storage of $CO_2$ in a manner such that $CO_2$ is sequestered (i.e., fixed) in the reduced-carbon footprint concrete compositions, where the sequestered $CO_2$ does not become part of the atmosphere. When reduced-carbon footprint concrete compositions are maintained under conditions conventional for their intended use, reduced-carbon footprint concrete compositions keep sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the reduced-carbon footprint concrete compositions. With respect to the reduced-carbon footprint concrete compositions, when employed for their intended use, the amount of degradation, if any, over the lifetime of the reduced-carbon footprint concrete compositions, as measured in terms of $CO_2$ gas release, will not exceed 5% per year, and in certain embodiments will not exceed 1% per year. Indeed, reduced-carbon footprint concrete compositions provided by the invention do not release more than 1%, 5%, or 10% of their total $CO_2$ when exposed to normal conditions of temperature and moisture, including rainfall of normal pH, for their intended use, for at least 1, 2, 5, 10, or 20 years, or for more than 20 years, for example, for more than 100 years. In some embodiments, reduced-carbon footprint concrete compositions do not release more than 1% of their total $CO_2$ when exposed to normal conditions of temperature and moisture, including rainfall of normal pH, for their intended use, for at least 1 year. In some embodiments, reduced-carbon footprint concrete compositions do not release more than 5% of their total $CO_2$ when exposed to normal conditions of temperature and moisture, including rainfall of normal pH, for their intended use, for at least 1 year. In some embodiments, reduced-carbon footprint concrete compositions do not release more than 10% of their total $CO_2$ when exposed to normal conditions of temperature and moisture, including rainfall of normal pH, for their intended use, for at least 1 year. In some embodiments, reduced-carbon footprint concrete compositions do not release more than 1% of their total $CO_2$ when exposed to normal conditions of temperature and moisture, including rainfall of normal pH, for their intended use, for at least 10 years. In some embodiments, reduced-carbon footprint concrete compositions do not release more than 1% of their total $CO_2$ when exposed to normal conditions of temperature and moisture, including rainfall of normal pH, for their intended use, for at least 100 years. In some embodiments, the reduced-carbon footprint concrete compositions do not release more than 1% of their total $CO_2$ when exposed to normal conditions of temperature and moisture, including rainfall of normal pH, for their intended use, for at least 1000 years.

Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the environment and intended use of the reduced-carbon footprint concrete composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of the reduced-carbon footprint concrete composition of the invention for a given period (e.g., 1, 10, 100, 1000, or more than 1000 years).

$CO_2$ content of the $CO_2$-sequestering component(s) (e.g., precipitation material comprising carbonates, bicarbonates, or a mixture thereof) of the reduced-carbon footprint concrete compositions may be monitored by any suitable method (e.g., coulometry). Other conditions may be adjusted as appropriate, including pH, pressure, UV radiation, and the like, again depending on the intended or likely environment. It will be appreciated that any suitable conditions may be used that one of skill in the art would reasonably conclude would indicate the requisite stability over the indicated time period. In addition, if accepted chemical knowledge indicates that the composition would have the requisite stability for the indicated period, this may be used as well, in addition to, or in place of actual measurements. For example, some carbonate compounds that may be part of a reduced-carbon footprint concrete composition of the invention (e.g., in a given polymorphic form) may be well-known geologically, and may be known to have withstood normal weather for decades, centuries, or even millennia, without appreciable breakdown, and so have the requisite stability.

Depending on the particular reduced-carbon footprint concrete composition, the amount of $CO_2$-sequestering component (e.g., precipitation material comprising carbonates, bicarbonates, or a mixture thereof) present may vary. In some instances, the amount of the $CO_2$-sequestering component (e.g., precipitation material comprising carbonates, bicarbonates, or a mixture thereof) in the reduced-carbon footprint concrete composition ranges from 5 to 100% (w/w), such as 5 to 90% (w/w), including 5 to 75% (w/w), 5 to 50% (w/w), 5 to 25% (w/w), and 5 to 10% (w/w).

Reduced-carbon footprint concrete compositions have reduced carbon footprints when compared to corresponding concrete compositions that lack the carbonate/bicarbonate component (e.g., $CO_2$-sequestering component). Using any convenient carbon footprint calculator, the magnitude of carbon footprint reduction of the reduced-carbon footprint concrete compositions of the invention as compared to corresponding concrete compositions that lack the carbonate/bicarbonate component (e.g., $CO_2$-sequestering component) may be 5% or more, such as 10% or more, including 25%, 50%, 75% or even 100% or more. In certain embodiments, the reduced-carbon footprint concrete compositions of the invention may be carbon neutral, in that they have substantially no, if any, calculated carbon footprint, e.g., as determined using any convenient carbon footprint calculator that may be relevant for a particular concrete composition of interest. Carbon neutral concrete compositions of the invention include those compositions that exhibit a carbon footprint of 50 lbs $CO_2/yd^3$ material or less, such as 10 lbs $CO_2/yd^3$ material or less, including 5 lbs $CO_2/yd^3$ material or less, where in certain embodiments the carbon neutral concrete compositions have 0 or negative lbs $CO_2/yd^3$ material, such as negative 1 or more, e.g., negative 3 or more lbs $CO_2/yd^3$ concrete composition. In some instances, the reduced-carbon footprint concrete compositions have a significantly negative carbon footprint, e.g., −100 or more lbs $CO_2/yd^3$ or less.

$CO_2$-sequestering components (i.e., precipitation material comprising carbonates, bicarbonates, or a combination thereof) of the invention comprise $CO_2$ that otherwise would have been released into the atmosphere, most of which results from combusting fossil fuels, which fuels are of plant origin. As such, $CO_2$-sequestering components of the invention, which comprise one or more synthetic carbonates and/or bicarbonates derived from industrial $CO_2$, reflect the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C\text{‰}=[(^{13}C/^{12}C \text{ sample} - {^{13}C/^{12}C} \text{ PDB standard})/(^{13}C/^{12}C \text{ PDB standard})] \times 1000$$

As such, the $\delta^{13}C$ value of the synthetic carbonate- and/or bicarbonate-containing precipitation material (e.g., $CO_2$-sequestering component) serves as a fingerprint for a $CO_2$ gas source, especially $CO_2$ released from burning fossil fuel. The $\delta^{13}C$ value may vary from source to source (i.e., fossil fuel source), but the $\delta^{13}C$ value for carbonate/bicarbonate components (e.g., $CO_2$-sequestering components) of the invention generally, but not necessarily, ranges between −9‰ to −35‰. In some embodiments, the $\delta^{13}C$ value for the synthetic carbonate-containing precipitation material may be between −1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}C$ value for the synthetic carbonate-containing precipitation material may be less than (i.e., more negative than) −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −40‰, −41‰, −42‰, −43‰, −44‰, or −45‰, wherein the more negative the $\delta^{13}C$ value, the more rich the synthetic carbonate-containing precipitation material is in $^{12}C$. Any suitable method may be used for measuring the $\delta^{13}C$ value, methods including, but not limited to, mass spectrometry or off-axis integrated-cavity output spectroscopy (off-axis ICOS).

In some embodiments, the invention provides a reduced-carbon footprint concrete composition containing a $CO_2$-sequestering component comprising carbonates, bicarbonates, or combinations thereof, where the carbon in the carbonates and/or bicarbonates has a $\delta^{13}C$ value less than −5‰. In some embodiments, the $\delta^{13}C$ value for the reduced-carbon footprint concrete composition may be between −1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}C$ value for the reduced-carbon footprint concrete composition may be less than (i.e., more negative than) −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰, wherein the more negative the $\delta^{13}C$ value, the more rich the synthetic carbonate-containing composition is in $^{12}C$.

The carbonate compounds of the $CO_2$-sequestering components may be metastable carbonate compounds precipitated from a solution of divalent cations, such as a saltwater, as described in greater detail below. The carbonate compound compositions of the invention include precipitated crystalline and/or amorphous carbonate compounds. Specific carbonate minerals of interest include, but are not limited to: calcium carbonate minerals, magnesium carbonate minerals, and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3 \cdot nH_2O$). Magnesium carbonate minerals of interest include, but are not limited to: magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), and amorphous magnesium calcium carbonate ($MgCO_3 \cdot nH_2O$). Calcium magnesium carbonate minerals of interest include, but are not limited to dolomite ($CaMgCO_3$), huntite ($CaMg_3(CO_3)_4$), and sergeevite ($Ca_2Mg_{11}(CO_3)_{13} \cdot H_2O$). In certain embodiments, non-carbonate compounds like brucite ($Mg(OH)_2$) may also form in combination with the minerals listed above. As indicated above, the compounds of the carbonate compound compositions may be metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals such as low-Mg calcite.

The carbonate/bicarbonate components (e.g., $CO_2$-sequestering components) of the invention may be derived from, e.g., precipitated from, a solution of divalent cations (e.g., an aqueous solution of divalent cations)(as described in greater detail below). As the carbonate/bicarbonate components (e.g., $CO_2$-sequestering components) may be precipitated from water, they might include one or more components that are present in the water from which they are derived. For example, where the solution of divalent cations is saltwater, the $CO_2$-sequestering product (e.g., precipitation material comprising carbonates, bicarbonates, or a mixture thereof) will include one or more compounds found in the saltwater source. These compounds identify the solid precipitations of the compositions that come from the saltwater source, where these identifying components and the amounts thereof may be collectively referred to herein as a saltwater source identifier. For example, if the saltwater source is seawater, identifying compounds that may be present in precipitation material include, but are not limited to: chloride, sodium, sulfur, potassium, bromide, silicon, strontium, and the like. Any such source-identifying or "marker" elements are generally present in small amounts, e.g., in amounts of 20,000 ppm or less, such as amounts of 2000 ppm or less. In certain embodiments, the "marker" compound may be strontium, which may be incorporated into, for example, an aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

In certain embodiments, the $CO_2$-sequestering component, which comprises carbonates, bicarbonates, or a mixture thereof, may be a supplementary cementitious material. SCMs are those materials which, though they may or may not be hydraulically cementitious in and of themselves, react to a degree with a hydraulic cement composition, such as Portland cement, to produce a cured material. In certain embodiments, $CO_2$-sequestering SCMs (e.g., SCM comprising carbonates, bicarbonates, or a mixture thereof) may be such that each ton of the SCM stores about 0.5 tons or more of $CO_2$, such as about 1 ton or more of $CO_2$, including about 1.2 tons or more of $CO_2$. For example, a $CO_2$-sequestering SCM (e.g., SCM comprising carbonates, bicarbonates, or a mixture thereof) of the invention may store about 0.5 tons or more of $CO_2$ per ton of SCM material. In other words, a $CO_2$-sequestering SCM (e.g., SCM comprising carbonates, bicarbonates, or a mixture thereof) of the invention may have a negative carbon footprint of $-0.5$ tons $CO_2$ per ton of material. In these embodiments, the $CO_2$-sequestering compound (e.g., carbonates, bicarbonates, or a combination thereof) may be present as a dry particulate composition, e.g., powder. In certain embodiments, the dry particulate compositions may be made up of particles having an average particle size ranging from 0.1 to 100 microns, such as 10 to 40 microns as determined using any convenient particle size determination protocol, such as Multi-detector laser scattering or sieving (i.e. <38 microns). In certain embodiments, multimodal, e.g., bimodal or other, distributions are present. Bimodal distributions allow the surface area to be minimized, thus allowing a lower liquids/solids mass ration for the cement yet providing smaller reactive particles for early reaction. In these instances, the average particle size of the larger size class can be upwards of 1000 microns (1 mm). The surface area of the components making up the SCM may vary. A given cement may have an average surface area sufficient to provide for a liquids to solids ratio upon combination with a liquid to produce a settable composition (e.g., as described in greater detail below) ranging from 0.5 $m^2$/gm to 50 $m^2$/gm, such as 0.75 to 20 $m^2$/gm and including 0.80 to 10 $m^2$/gm. In certain embodiments, the surface area of the cement ranges from 0.9 to 5 $m^2$/gm, such as 0.95 to 2 $m^2$/gm and including 1 to 2 $m^2$/gm, as determined using the surface area determination protocol described in Breunner, Emmit, and Teller (1953).

When present, the amount of $CO_2$-sequestering SCM (e.g., SCM comprising carbonates, bicarbonates, or a mixture thereof) in the concrete composition may vary. In certain embodiments, the concrete includes from 5 to 50% w/w, such as 5 to 25% w/w, including 5 to 10% w/w 10% to 25% w/w of $CO_2$-sequestering SCM (e.g., SCM comprising carbonates, bicarbonates, or a mixture thereof). In certain embodiments, the carbonate compound composition makes up greater than 50% of the cement.

Instead of, or in addition to, a $CO_2$-sequestering SCM, the concrete compositions may include one or more types of $CO_2$-sequestering aggregates (e.g., aggregates comprising carbonates, bicarbonates, or a mixture thereof), which may be fine aggregates, coarse aggregates, etc. The term aggregate is used herein in its art accepted manner to refer to a particulate composition that finds use in concretes, mortars and other materials, e.g., as defined above. Aggregates of the invention may be particulate compositions that may be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention (which may be referred to as "sands") have an average particle size ranging from 0.001 in to 0.25 in, such as 0.05 in to 0.125 in and including 0.01 in to 0.08 in. As such, fine aggregate may be used as a replacement for sand in concrete compositions. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 0.125 in to 6 in, such as 0.187 in to 3.0 in and including 0.25 in to 1.0 in. As such, coarse aggregate may be used as a replacement for conventional aggregate in concrete compositions.

In some embodiments, $CO_2$-sequestering aggregates (i.e., synthetic aggregates comprising carbonates, bicarbonates, or a mixture thereof) of the invention may be such that each ton of the aggregate stores about 0.5 tons or more of $CO_2$, such as about 1 ton or more of $CO_2$, including about 1.2 tons or more of $CO_2$. For example, a $CO_2$-sequestering aggregate (e.g., aggregate comprising carbonates, bicarbonates, or a mixture thereof) of the invention may store about 0.5 tons or more of $CO_2$ per ton of material. In other words, a $CO_2$-sequestering aggregate (e.g., aggregate comprising carbonates, bicarbonates, or a mixture thereof) of the invention may have a negative carbon footprint of $-0.5$ tons $CO_2$ per ton of material. In addition, aggregates of the invention have a density that may vary so long as the aggregate provides the desired properties to the building material in which it is employed. In certain instances, the density of the aggregates ranges from 1.1 to 5 gm/cc, such as 1.5 gm/cc to 3.15 gm/cc, and including 1.8 gm/cc to 2.7 gm/cc. The hardness of the aggregate particles making up the aggregate compositions of the invention may also vary, and in certain instances the Mohr's hardness ranges from 1.5 to 9, such as 2 to 7, including 4 to 5.

The weight ratio of the cement component (e.g., clinker and SCM) to the aggregate component, e.g., fine and coarse aggregate, may vary. In certain embodiments, the weight ratio of cement component to aggregate component in the dry concrete component ranges from 1:10 to 4:10, such as 2:10 to 5:10 and including from 55:1000 to 70:100.

The $CO_2$-sequestering aggregates of the invention, which comprise carbonates, bicarbonates, or a mixture thereof, include one or more carbonate compounds, e.g., as described above, and further described in U.S. Provisional Application No. 61/056,972.

Admixtures

In certain embodiments, the cements may be employed with one or more admixtures. In some embodiments, the cements may be employed with one or more $CO_2$-sequestering admixtures. Admixtures are compositions added to concrete to provide it with desirable characteristics that may not obtainable with basic concrete mixtures or to modify properties of the concrete to make it more readily useable or more suitable for a particular purpose or for cost reduction. As is known in the art, an admixture may be any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments, the amounts of these components, which include synthetic admixtures, range from 1 to 50% w/w, such as 5 to 25% w/w, including 10 to 20% w/w, for example, 2 to 10% w/w.

Major reasons for using admixtures may be (1) to achieve certain structural improvements in the resulting cured concrete; (2) to improve the quality of concrete through the successive stages of mixing, transporting, placing, and curing during adverse weather or traffic conditions; (3) to overcome certain emergencies during concreting operations; and/or (4) to reduce the cost of concrete construction. In some instances, the desired concrete performance characteristics can only be achieved by the use of an admixture. In some cases, using an admixture allows for the use of less expensive construction methods or designs, the savings from which can more than offset the cost of the admixture.

Admixtures of interest include finely divided mineral admixtures. Finely divided mineral admixtures are materials in powder or pulverized form added to concrete before or during the mixing process to improve or change some of the plastic or hardened properties of Portland cement concrete. The finely divided mineral admixtures can be classified according to their chemical or physical properties as: cementitious materials; pozzolans; pozzolanic and cementitious materials; and nominally inert materials. A pozzolan is a siliceous or aluminosiliceous material that possesses little or no cementitious value but will, in the presence of water and in finely divided form, chemically react with the calcium hydroxide released by the hydration of Portland cement to form materials with cementitious properties. Pozzolans can also be used to reduce the rate at which water under pressure is transferred through concrete. Diatomaceous earth, opaline cherts, clays, shales, fly ash, silica fume, volcanic tuffs, and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

Fly ash, as well as material comprising metal silicates (e.g., wollastonite, mafic minerals such as olivine and serpentine), may be used to produce $CO_2$-sequestering pozzolanic material (i.e., a synthetic admixture), which may be used in carbon neutral or carbon negative concrete compositions of the invention. Such pozzolanic materials are described in U.S. patent application Ser. No. 12/486,692, filed 17 Jun. 2009 and U.S. patent application Ser. No. 12/501,217, filed 10 Jul. 2009, each of which is incorporated herein by reference. Briefly, digestion of fly ash (e.g., by slaking) or material comprising metal silicates generates, in addition to divalent cations, proton-removing agents, or a combination thereof, silica-based material, which, if present during precipitation of carbonate compositions, may be encapsulated by calcium carbonate, magnesium carbonate, or a combination thereof. As such, silica-based material acts as a nucleation site for precipitation of calcium carbonate, magnesium carbonate, or a mixture thereof. Pozzolanic material prepared in this way may be passivated, which reduces the reactivity of the pozzolanic material, which may be desired in certain embodiments. $CO_2$-sequestering pozzolanic material, which comprises synthetic carbonates, bicarbonates, or a mixture thereof, in carbon neutral or carbon negative concrete may range from 1 to 50% w/w, such as 5 to 25% w/w, including 10 to 20% w/w, for example, 2 to 10% w/w. In addition, $CO_2$-sequestering pozzolanic material (e.g., pozzolanic material comprising carbonates, bicarbonates, or a combination thereof) is such that each ton of the pozzolanic material stores 0.25 tons or more of $CO_2$, such as 0.5 tons or more of $CO_2$, including 1 ton or more of $CO_2$, for example, 2 tons or more of $CO_2$ per ton of pozzolanic material. For example, a $CO_2$-sequestering pozzolanic material (e.g., pozzolanic material comprising carbonates, bicarbonates, or a combination thereof) of the invention may store about 0.25 tons or more of $CO_2$ per ton of pozzolanic material. In other words, a $CO_2$-sequestering pozzolanic material of the invention may have a negative carbon footprint of –0.25 tons $CO_2$ per ton of material.

One type of admixture of interest may be a plasticizer. Plasticizers may be added to a concrete to provide it with improved workability for ease of placement with reduced consolidating effort and in reinforced concretes required to flow uniformly without leaving void space under reinforcing bars. Also of interest as admixtures are accelerators, retarders, air-entrainers, foaming agents, water reducers, corrosion inhibitors, and pigments. Accelerators are used to increase the cure rate (hydration) of the concrete formulation and are of particular importance in applications where it is desirable for the concrete to harden quickly and in low temperature applications. Retarders act to slow the rate of hydration and increase the time available to pour the concrete and to form it into a desired shape. Retarders are of particular importance in applications where the concrete is being used in hot climates. Air-entrainers are used to distribute tiny air bubbles throughout the concrete. Air-entrainers are of particular value for utilization in regions that experience cold weather because the tiny entrained air bubbles help to allow for some contraction and expansion to protect the concrete from freeze-thaw damage. Pigments can also be added to concrete to provide it with desired color characteristics for aesthetic purposes.

As such, admixtures of interest include, but are not limited to: set accelerators, set retarders, air-entraining agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. When using an admixture, the fresh cementitious composition, to which the admixture raw materials are introduced, may be mixed for sufficient time to cause the admixture raw materials to be dispersed relatively uniformly throughout the fresh concrete.

Set accelerators are used to accelerate the setting and early strength development of concrete. A set accelerator that can be used with the admixture system can be, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxyalkylamine; a halide salt of an alkali metal or alkaline earth metal (e.g., chloride). Examples of set accelerators that may be used in the present dispensing method include, but are not limited to, POZZOLITH®NC534, nonchloride type set accelerator and/or RHEOCRETE®CNI calcium nitrite-based corrosion inhibitor, both sold under the above trademarks by BASF Admixtures Inc. of Cleveland, Ohio.

Also of interest are set retarding admixtures. Set retarding, also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Retarders that can be used include, but are not limited to an oxy-boron compound, corn syrup, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427,617 and 5,203,919, incorporated herein by reference. A further example of a retarder suitable for use in the admixture system is a hydration control admixture sold under the trademark DELVO® by BASF Admixtures Inc. of Cleveland, Ohio.

Also of interest as admixtures are air entrainers. The term air entrainer includes any substance that will entrain air in cementitious compositions. Some air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves concrete's resistance to surface scaling caused by chemical deicers. Air entrainment also increases the workability of fresh concrete while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

Also of interest as admixtures are defoamers. Defoamers are used to decrease the air content in the cementitious composition. Examples of defoamers that can be utilized in the cementitious composition include, but are not limited to mineral oils, vegetable oils, fatty acids, fatty acid esters, hydroxyl functional compounds, amides, phosphoric esters, metal soaps, silicones, polymers containing propylene oxide moieties, hydrocarbons, alkoxylated hydrocarbons, alkoxylated polyalkylene oxides, tributyl phosphates, dibutyl phthalates, octyl alcohols, water-insoluble esters of carbonic and boric acid, acetylenic diols, ethylene oxide-propylene oxide block copolymers and silicones.

Also of interest as admixtures are dispersants. The term dispersant as used throughout this specification includes, among others, polycarboxylate dispersants, with or without polyether units. The term dispersant is also meant to include those chemicals that also function as a plasticizer, water reducer such as a high range water reducer, fluidizer, antiflocculating agent, or superplasticizer for cementitious compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group. Examples of polycarboxylate dispersants can be found in U.S. Pub. No. 2002/0019459 A1, U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are all incorporated herein by reference as if fully written out below. The polycarboxylate dispersants of interest include but are not limited to dispersants or water reducers sold under the trademarks GLENIUM® 3030NS, GLENIUM® 3200 HES, GLENIUM 3000NS® (BASF Admixtures Inc., Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

Also of interest as admixtures are alkali reactivity reducers. Alkali reactivity reducers can reduce the alkali-aggregate reaction and limit the disruptive expansion forces that this reaction can produce in hardened concrete. The alkali-reactivity reducers include pozzolans (fly ash, silica fume), blast-furnace slag, salts of lithium and barium, and other air-entraining agents.

Natural and synthetic admixtures are used to color concrete for aesthetic and safety reasons. These coloring admixtures are usually composed of pigments and include carbon black, iron oxide, phthalocyanine, umber, chromium oxide, titanium oxide, cobalt blue, and organic coloring agents.

Also of interest as admixtures are corrosion inhibitors. Corrosion inhibitors in concrete serve to protect embedded reinforcing steel from corrosion due to its highly alkaline nature. The high alkaline nature of the concrete causes a passive and noncorroding protective oxide film to form on steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminites, amines and related chemicals.

Also of interest are dampproofing admixtures. Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Also of interest are gas former admixtures. Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Also of interest are permeability reducers. Permeability reducers are used to reduce the rate at which water under pressure is transmitted through concrete. Silica fume, fly ash, ground slag, natural pozzolans, water reducers, and latex can be employed to decrease the permeability of the concrete.

Also of interest are rheology modifying agent admixtures. Rheology modifying agents can be used to increase the viscosity of cementitious compositions. Suitable examples of rheology modifier include firmed silica, colloidal silica, hydroxyethyl cellulose, hydroxypropyl cellulose, fly ash (as defined in ASTM C618), mineral oils (such as light naphthenic), hectorite clay, polyoxyalkylenes, polysaccharides, natural gums, or mixtures thereof.

Also of interest are shrinkage compensation admixtures. The shrinkage compensation agent which may be used in the cementitious composition may include, but is not limited, to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® is an example of a shrinkage reducing agent and is available from BASF Admixtures Inc. of Cleveland, Ohio.

Bacteria and fungal growth on or in hardened concrete may be partially controlled through the use of fungicidal and germicidal admixtures. The most effective materials for these purposes are polyhalogenated phenols, dialdrin emulsions, and copper compounds.

Also of interest in certain embodiments are workability improving admixtures. Entrained air, which acts like a lubricant, can be used as a workability improving agent. Other workability agents are water reducers and certain finely divided admixtures.

In certain embodiments, the cements of the invention are employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

Preparation of Reduced-Carbon Footprint Compositions

Aspects of the invention include methods of preparing reduced-carbon footprint concrete compositions. Reduced-carbon footprint concrete compositions may be prepared by first producing a carbonate/bicarbonate component (e.g., $CO_2$-sequestering component [i.e., precipitation material]) and then preparing reduced-carbon footprint concrete compositions from the carbonate/bicarbonate component (e.g., $CO_2$-sequestering component). The carbonate/bicarbonate component (e.g., $CO_2$-sequestering component) of the reduced-carbon footprint concrete compositions may be produced from a source of $CO_2$, a source of proton-removing agents (and/or methods of effecting proton removal), and a source of divalent cations, each of which materials are described in further detail immediately below.

Carbon Dioxide

Methods of the invention include contacting a volume of a solution of divalent cations (e.g., an aqueous solution of divalent cations) with a source of $CO_2$, then subjecting the resultant solution to conditions that facilitate precipitation. Methods of the invention further include contacting a volume of a solution of divalent cations (e.g., an aqueous solution of divalent cations) with a source of $CO_2$ while subjecting the solution to conditions that facilitate precipitation. There may be sufficient carbon dioxide in the divalent cation-containing solution to precipitate significant amounts of carbonate-containing precipitation material (e.g., from seawater); however, additional carbon dioxide may be used. The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source may be a waste gas stream (i.e., a by-product of an active process of the industrial plant) such as exhaust from an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like. Combustion gas from any convenient source may be used in methods and systems of the invention. In some embodiments, combustion gases in post-combustion effluent stacks of industrial plants such as power plants, cement plants, and coal processing plants may be used.

Thus, the waste streams may be produced from a variety of different types of industrial plants. Suitable waste streams for the invention include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, a waste stream suitable for systems and methods of the invention may be sourced from a coal-fired power plant, such as a pulverized coal power plant, a supercritical coal power plant, a mass burn coal power plant, a fluidized bed coal power plant; in some embodiments, the waste stream may be sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas produced by the gasification of organic matter, for example, coal, biomass, etc.) may be used. In some embodiments, waste streams from integrated gasification combined cycle (IGCC) plants may be used. In some embodiments, waste streams produced by Heat Recovery Steam Generator (HRSG) plants may be used in accordance with systems and methods of the invention.

Waste streams produced by cement plants may also be suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries may also be useful sources of waste streams that include carbon dioxide.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and $NO_2$), SOx (monosulfur oxides: SO, $SO_2$ and $SO_3$), VOC (volatile organic compounds), heavy metals such as mercury, and particulate matter (particles of solid or liquid suspended in a gas). Flue gas temperature may also vary. In some embodiments, the temperature of the flue gas comprising $CO_2$ may be from 0° C. to 2000° C., such as from 60° C. to 700° C., and including 100° C. to 400° C.

In some embodiments, one or more additional components or co-products (i.e., products produced from other starting materials [e.g., SOx, NOx, etc.] under the same conditions employed to convert $CO_2$ into carbonates) may be precipitated or trapped in precipitation material formed by contacting the waste gas stream comprising these additional components with a solution comprising divalent cations (e.g., alkaline earth metal ions such as $Ca^{2+}$ and $Mg^{2+}$). Sulfates, sulfites, and the like of calcium and/or magnesium may be precipitated or trapped in precipitation material (further comprising calcium and/or magnesium carbonates) produced from waste gas streams comprising SOx (e.g., $SO_2$). Magnesium and calcium may react to form $MgSO_4$, $CaSO_4$, respectively, as well as other magnesium-containing and calcium-containing compounds (e.g., sulfites), effectively removing sulfur from the flue gas stream without a desulfurization step such as flue gas desulfurization ("FGD"). In addition, $CaCO_3$, $MgCO_3$, and related compounds may be formed without additional release of $CO_2$. In instances where the solution of divalent cations contains high levels of sulfur compounds (e.g., sulfate), the solution may be enriched with calcium and magnesium so that calcium and magnesium are available to form carbonate compounds after, or in addition to, formation of $CaSO_4$, $MgSO_4$, and related compounds. In some embodiments, a desulfurization step may be staged to coincide with precipitation of carbonate-containing precipitation material, or the desulfurization step may be staged to occur before precipitation. In some embodiments, multiple reaction products (e.g., $MgCO_3$, $CaCO_3$, $CaSO_4$, mixtures of the foregoing, and the like) may be collected at different stages, while in other embodiments a single reaction product (e.g., precipitation material comprising carbonates, sulfates, etc.) may be collected. In step with these embodiments, other components, such as heavy metals (e.g., mercury, mercury salts, mercury-containing compounds), may be trapped in the carbonate-containing precipitation material or may precipitate separately.

A portion of the gaseous waste stream (i.e., not the entire gaseous waste stream) from an industrial plant may be used to produce precipitation material. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant may be employed in precipitation of precipitation material. In these embodiments, 80% or more, such as 90% or more, including 95% or more, up to 100% of the gaseous waste stream (e.g., flue gas) generated by the source may be employed for precipitation of precipitation material.

Although industrial waste gas offers a relatively concentrated source of combustion gases, methods and systems of the invention may also be applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material. In these cases, the concentration of pollutants, e.g., $CO_2$, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

Divalent Cations

Methods of the invention include contacting a volume of a solution of divalent cations (e.g., an aqueous solution of divalent cations) with a source of $CO_2$ and subjecting the resultant solution to conditions that facilitate precipitation. In some embodiments, a volume of a solution of divalent cations (e.g., an aqueous solution of divalent cations) may be contacted with a source of $CO_2$ while subjecting the solution to conditions that facilitate precipitation. Divalent cations may come from any of a number of different divalent cation sources depending upon availability at a particular location. Such sources include industrial wastes, seawater, brines, hard waters, rocks and minerals (e.g., lime, periclase, material comprising metal silicates such as serpentine and olivine), and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Fossil fuel burning ash, cement kiln dust, and slag, collectively waste sources of metal oxides, further described in U.S. patent application Ser. No. 12/486,692, filed 17 Jun. 2009, the disclosure of which is incorporated herein by reference. Any of the divalent cations sources described herein may be mixed and matched for the purpose of practicing the invention. For example, material comprising metal silicates (e.g. serpentine, olivine), which are further described in U.S. patent application Ser. No. 12/501,217, filed 10 Jul. 2009, which application is incorporated herein by reference, may be combined with any of the sources of divalent cations described herein for the purpose of practicing the invention.

In some locations, a convenient source of divalent cations for preparation of a carbonate/bicarbonate component (e.g., $CO_2$-sequestering component) of the invention may be water (e.g., an aqueous solution comprising divalent cations such as seawater or surface brine), which may vary depending upon the particular location at which the invention is practiced. Suitable solutions of divalent cations that may be used include aqueous solutions comprising one or more divalent cations, e.g., alkaline earth metal cations such as $Ca^{2+}$ and $Mg^{2+}$. In some embodiments, the aqueous solution of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}$:$Mg^{2+}$) in the aqueous solution of divalent cations may be between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations may be between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}$:$Ca^{2+}$) in the aqueous solution of divalent cations may be between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations may be between 1:1 and 1:10; 1:5 and 1:25; 1:10 and 1:50; 1:25 and 1:100; 1:50 and 1:500; or 1:100 and 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater, any of which may be naturally occurring or anthropogenic. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the water source from which divalent cations are derived is a mineral rich (e.g., calcium-rich and/or magnesium-rich) freshwater source. In some embodiments, the water source from which divalent cations are derived may be a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cation are derived may be an anthropogenic brine selected from a geothermal plant wastewater or a desalination wastewater.

Freshwater may be a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ may be added to freshwater. In some embodiments, monovalent cations selected from Na+ and K+ are added to freshwater. In some embodiments, freshwater comprising $Ca^{2+}$ may be combined with combustion ash (e.g., fly ash, bottom ash, boiler slag), or products or processed forms thereof, yielding a solution comprising calcium and magnesium cations.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing precipitation material. If desired, the water may be cooled prior to entering a precipitation system of the invention. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

Proton-Removing Agents and Methods for Effecting Proton Removal

Methods of the invention include contacting a volume of a solution of divalent cations (e.g., an aqueous solution of divalent cations) with a source of $CO_2$ (to dissolve $CO_2$) and subjecting the resultant solution to conditions that facilitate precipitation. In some embodiments, a volume of a solution of divalent cations (e.g., an aqueous solution of divalent cations)

may be contacted with a source of $CO_2$ (to dissolve $CO_2$) while subjecting the solution to conditions that facilitate precipitation. The dissolution of $CO_2$ into the solution of divalent cations produces carbonic acid, a species in equilibrium with both bicarbonate and carbonate. To produce carbonate-containing precipitation material, protons are removed from various species (e.g. carbonic acid, bicarbonate, hydronium, etc.) in the divalent cation-containing solution to shift the equilibrium toward carbonate. As protons are removed, more $CO_2$ goes into solution. In some embodiments, proton-removing agents and/or methods may be used while contacting a divalent cation-containing solution (e.g., an aqueous solution comprising divalent cations) with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. In some embodiments, organisms that excrete basic molecules or solutions in their normal metabolism may be used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms may be used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms may be cultured separately from the precipitation reaction mixture, wherein proton-removing agents or solutions comprising proton-removing agents are used for addition to the precipitation reaction mixture. In some embodiments, naturally occurring or manufactured enzymes may be used in combination with proton-removing agents to invoke precipitation of precipitation material. Carbonic anhydrase, which is an enzyme produced by plants and animals, accelerates transformation of carbonic acid to bicarbonate in solution. As such, carbonic anhydrase may be used to enhance dissolution of $CO_2$ and accelerate precipitation of precipitation material, as described in U.S. Provisional Patent Application 61/252,929 filed 19 Oct. 2009, which is incorporated herein by reference in its entirety.

Chemical agents for effecting proton removal generally refer to synthetic chemical agents produced in large quantities and commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide (Ca(OH)2), or magnesium hydroxide (Mg(OH)$_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene may be used to remove protons from various species (e.g., carbonic acid, bicarbonate, hydronium, etc.) for precipitation of precipitation material. In some embodiments, ammonia may be used to raise pH to a level sufficient to precipitate precipitation material from a solution of divalent cations and an industrial waste stream. Super bases suitable for use as proton-removing agents include sodium ethoxide, sodium amide (NaNH$_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) may be also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining may be used to modify pH, wherein the waste is selected from red mud from the Bayer aluminum extraction process; waste from magnesium extraction from seawater (e.g., Mg(OH)2 such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia (NH$_3$) or both. As such, agricultural waste may be used in some embodiments of the invention as a proton-removing agent. This agricultural waste is often collected in ponds, but it may also percolate down into aquifers, where it may be accessed and used.

Electrochemical methods may be another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods may be used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in a solution that does not contain divalent cations may be treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas may be convenient for use in systems and methods of the invention. Low-voltage electrochemical methods to remove protons that do not generate oxygen gas may also be convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088242, filed 23 Dec. 2008; International Patent Application No. PCT/US09/32301, filed 28 Jan. 2009; International Patent Application No. PCT/US09/48511, filed 24 Jun. 2009; and U.S. patent application Ser. No. 12/541,055, filed 13 Aug. 2009, each of which are incorporated herein by reference in their entirety.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. Provisional Patent Application No. 61/081,299, filed 16 Jul. 2008, and U.S. Provisional Patent Application No. 61/091,729, the disclosures of which are incorporated herein by reference. Combinations of the above mentioned sources of proton-removing agents and methods for effecting proton removal may be employed.

A variety of different methods may be employed to prepare the $CO_2$-sequestrating component of the concretes of the invention from the source of $CO_2$, the source of divalent cations, and the source of proton-removing agents. $CO_2$ sequestration protocols of interest include, but are not limited to, those disclosed in U.S. patent application Ser. Nos. 12/126,776 and 12/163,205; as well as U.S. Provisional Patent Application Nos. 61/126,776, filed 23 May 2008; Ser. No. 12/163,205, filed 27 Jun. 2008; Ser. No. 12/344,019, filed 24 Dec. 2008; and Ser. No. 12/475,378, filed 29 May 2009, as well as U.S. Provisional Patent Application Nos. 61/017,405; 61/017,419; 61/057,173; 61/056,972; 61/073,319; 61/079,790; 61/081,299; 61/082,766; 61/088,347; 61/088,340; 61/101,629; and 61/101,631017,405, filed 28 Dec. 2007; 61/017,419, filed 28 Dec. 2007; 61/057,173, filed 29 May 2008; 61/056,972, filed 29 May 2008; 61/073,319, filed 17 Jun. 2008; 61/079,790, 10 Jul. 2008; 61/081,299, filed 16 Jul. 2008; 61/082,766, filed 22 Jul. 2008; 61/088,347, filed 13 Aug. 2008; 61/088,340, filed 12 Aug. 2008; 61/101,629, filed 30 Sep. 2008; and 61/101,631, filed 30 Sep. 2008; each of which are incorporated herein by reference.

$CO_2$-sequestering components (e.g., components comprising carbonates, bicarbonates, or a combination thereof) of the invention include carbonate compositions that may be produced by precipitating a calcium and/or magnesium carbonate composition from a solution of divalent cations. The carbonate compound compositions of the invention include precipitated crystalline and/or amorphous carbonate compounds. The carbonate compound compositions that make up the $CO_2$-sequestering components (e.g., components comprising carbonates, bicarbonates, or a combination thereof) of the invention include metastable carbonate compounds that may be precipitated from a solution of divalent cations, such as a saltwater, as described in greater detail below.

For convenience, the invention herein is sometimes described in terms of saltwater; however, it is to be understood that any source of water comprising divalent cations may be used. Saltwater-derived carbonate compound compositions of the invention (i.e., compositions derived from saltwater and made up of one or more different carbonate crystalline and/or amorphous compounds with or without one or more hydroxide crystalline or amorphous compounds) are derived from a saltwater. As such, they comprise compositions that are obtained from a saltwater in some manner, e.g., by treating a volume of a saltwater in a manner sufficient to produce the desired carbonate compound composition from the initial volume of saltwater. The carbonate compound compositions of certain embodiments may be produced by precipitation from a solution of divalent cations (e.g., a saltwater) that includes alkaline earth metal cations, such as calcium and magnesium, etc., where such solutions of divalent cations may be collectively referred to as alkaline earth metal-containing waters.

The saltwater employed in methods may vary. As reviewed above, saltwater of interest include brackish water, seawater and brine, as well as other salines having a salinity that is greater than that of freshwater (which has a salinity of less than 5 ppt dissolved salts). In some embodiments, calcium rich waters may be combined with magnesium silicate minerals, such as olivine or serpentine, in solution that has become acidic due to the addition on carbon dioxide to form carbonic acid, which dissolves the magnesium silicate, leading to the formation of calcium magnesium silicate carbonate compounds as mentioned above.

In methods of producing the carbonate compound compositions of the invention, a volume of water may be subjected to carbonate compound precipitation conditions sufficient to produce a carbonate-containing precipitation material and a mother liquor (i.e., the part of the water that is left over after precipitation of the carbonate compound(s) from the saltwater). The resultant precipitation material and mother liquor collectively make up the carbonate compound compositions of the invention. Any convenient precipitation conditions may be employed, which conditions result in the production of a carbonate compound composition sequestration product.

Conditions that facilitate precipitation (i.e., precipitation conditions) may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitation material.

In normal seawater, 93% of the dissolved $CO_2$ may be in the form of bicarbonate ions ($HCO_3^-$) and 6% may be in the form of carbonate ions ($CO_3^{2-}$). When calcium carbonate precipitates from normal seawater, $CO_2$ is released. In fresh water, above pH 10.33, greater than 90% of the carbonate is in the form of carbonate ion, and no $CO_2$ is released during the precipitation of calcium carbonate. In seawater this transition occurs at a slightly lower pH, closer to a pH of 9.7. While the pH of the water employed in methods may range from pH 5 to pH 14 during a given precipitation process, in certain embodiments the pH may be raised to alkaline levels in order to drive the precipitation of carbonate compounds, as well as other compounds, e.g., hydroxide compounds, as desired. In certain of these embodiments, the pH may be raised to a level that minimizes if not eliminates $CO_2$ production during precipitation, causing dissolved $CO_2$, e.g., in the form of carbonate and bicarbonate, to be trapped in the precipitation material. In these embodiments, the pH may be raised to 10 or higher, such as 11 or higher.

The pH of the water may be raised using any convenient approach. In certain embodiments, a proton-removing agent may be employed, where examples of such agents include oxides, hydroxides (e.g., calcium oxide in fly ash, potassium hydroxide, sodium hydroxide, brucite ($Mg(OH)_2$, etc.), carbonates (e.g., sodium carbonate), and the like, many of which are described above. One such approach for raising the pH of the precipitation reaction mixture or precursor thereof (e.g., divalent cation-containing solution) is to use the coal ash from a coal-fired power plant, which contains many oxides. Other coal processes, like the gasification of coal, to produce syngas, also produce hydrogen gas and carbon monoxide, and may serve as a source of hydroxide as well. Some naturally occurring minerals, such as serpentine, contain hydroxide, and may be dissolved to yield a source of hydroxide. The addition of serpentine, also releases silica and magnesium into the solution, leading to the formation of silica-containing precipitation material. The amount of proton-removing agent that is added to the precipitation reaction mixture or precursor thereof will depend on the particular nature of the proton-removing agent and the volume of the precipitation reaction mixture or precursor thereof being modified, and will be sufficient to raise the pH of the precipitation reaction mixture or precursor thereof to the desired pH. Alternatively, the pH of the precipitation reaction mixture or precursor thereof may be raised to the desired level by electrochemical means as described above. Additional electrochemical methods may be used under certain conditions. For example, electrolysis may be employed, wherein the mercury cell process (also called the Castner-Kellner process); the diaphragm cell process, the membrane cell process, or some combination thereof may be used. Where desired, byproducts of the hydrolysis product, e.g., $H_2$, sodium metal, etc. may be harvested and employed for other purposes, as desired.

In yet other embodiments, the pH-elevating approach described in U.S. Provisional Patent Application Nos. 61/081,299, filed 16 Jul. 2008, and 61/091,729, filed 25 Aug. 2008, may be employed, the disclosures of which are incorporated herein by reference.

Additives other than pH-elevating agents may also be introduced into the water in order to influence the nature of the precipitation material produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$, which precipitates in a variety of different morphologies and converts rapidly to calcite, may be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitation material can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite may be the preferred polymorph. As such, a wide range of magnesium:calcium ratios may be employed, including, for example, 100:1, 50:1, 20:1, 10:1, 5:1, 2:1, 1:1, 1:2, 1:5, 1:10, 1:20, 1:50, 1:100, or any of the ratios mentioned above. In certain embodiments, the magnesium:calcium ratio may be determined by the source of water employed in the precipitation process (e.g., seawater, brine, brackish water, fresh water), whereas in other embodiments, the magnesium:calcium ratio may be adjusted to fall within a certain range.

Rate of precipitation also has a large effect on compound phase formation. The most rapid precipitation may be achieved by seeding the solution with a desired phase. Without seeding, rapid precipitation may be achieved by rapidly increasing the pH of the seawater, which results in more amorphous constituents. When silica is present, the more rapid the reaction rate, the more silica is incorporated in the carbonate-containing precipitation material. The higher the pH is, the more rapid the precipitation is and the more amorphous the precipitation material.

Accordingly, a set of precipitation conditions to produce a desired precipitation material from a solution of divalent cations includes, in certain embodiments, the water's temperature and pH, and in some instances, the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate-containing precipitation material according to the invention may be batch or continuous protocols. It will be appreciated that precipitation conditions may be different to produce a given precipitation material in a continuous flow system compared to a batch system.

In certain embodiments, the methods further include contacting the volume of water that is subjected to the mineral precipitation conditions with a source of $CO_2$. Contact of the water with the source of $CO_2$ may occur before and/or during the time when the water is subjected to $CO_2$ precipitation conditions. Accordingly, embodiments of the invention include methods in which the volume of water may be contacted with a source of $CO_2$ prior to subjecting the volume of saltwater to mineral precipitation conditions. Embodiments of the invention include methods in which the volume of saltwater may be contacted with a source of $CO_2$ while the volume of saltwater is being subjected to carbonate compound precipitation conditions. Embodiments of the invention include methods in which the volume of water may be contacted with a source of a $CO_2$ both prior to subjecting the volume of saltwater to carbonate compound precipitation conditions and while the volume of saltwater is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The source of $CO_2$ that may be contacted with the volume of saltwater in these embodiments may be any convenient $CO_2$ source, and the contact protocol may be any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. For exemplary system and methods for contacting the solution of divalent cations with the source of $CO_2$, see U.S. Provisional Patent Application Nos. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference.

The above protocol results in the production of a slurry of a carbonate/bicarbonate precipitation material (e.g., $CO_2$-sequestering precipitation material) and a mother liquor. Where desired, the compositions made up of the precipitation material and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

The slurry components may then be separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source may be carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source may be carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feed water for the methods of invention, e.g., an ocean or sea. Alternatively, the mother liquor may be further processed, e.g., subjected to desalination protocols, as described further in U.S. patent application Ser. No. 12/163,205; the disclosure of which is incorporated herein by reference.

In certain embodiments, following production of the precipitation material (e.g., $CO_2$-sequestering component), the resultant material may be separated from the mother liquor to produce separated precipitation material (e.g., $CO_2$-sequestering product). Separation of the precipitation material (e.g., $CO_2$-sequestering component) may be achieved using any convenient approach, including a mechanical approach, e.g., where bulk excess water is drained from the precipitation material, e.g., either by gravity alone or with the addition of vacuum, mechanical pressing, by filtering the precipitation material from the mother liquor to produce a filtrate, etc. Separation of bulk water produces, in certain embodiments, a wet, dewatered precipitation material.

The resultant dewatered precipitation material may then be dried, as desired, to produce a dried product. Drying may be achieved by air drying the wet precipitation material. Where the wet precipitation material is air dried, air drying may be at room or elevated temperature. In yet another embodiment, the wet precipitation material may be spray dried to dry the precipitation material, where the liquid containing the precipitation material is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. Where desired, the dewatered precipitation material product may be washed before drying. The precipitation material may be washed with freshwater, e.g., to remove salts (such as NaCl) from the dewatered precipitation material.

In certain embodiments, the precipitation material may be refined (i.e., processed) in some manner prior to subsequent use. Refinement may include a variety of different protocols. In certain embodiments, the product may be subjected to mechanical refinement, e.g., grinding, in order to obtain a product with desired physical properties, e.g., particle size, etc.

In some embodiments, the product may be employed as a "supplementary cementitious material" (SCM). SCMs are those materials which, though they may or may not be hydraulically cementitious in and of themselves, react to a degree with a hydraulic cement composition, such as Portland cement, to produce a cured material. Examples of common SCMs for use in Portland cement compositions include fly ash and ground granulated blast furnace slag.

In certain embodiments, the product may be utilized to produce aggregates. The resultant precipitation material may then prepared as an aggregate, with or without drying the powders. In certain embodiments where the drying process produces particles of the desired size, little if any additional work may be required to produce the aggregate. In yet other embodiments, further processing of the precipitation material may be performed in order to produce the desired aggregate. For example, as noted above, the precipitation material may be combined with fresh water in a manner sufficient to cause the precipitation material to form a solid product, where the metastable carbonate compounds present in the precipitation material have converted to a form that is stable in fresh water. By controlling the water content of the wet material, the porosity, and eventual strength and density of the final aggregate may be controlled. Typically a wet cake will be 40-60 volume % water. For denser aggregates, the wet cake will be <50% water, for less dense cakes, the wet cake will be >50% water. After hardening, the resultant solid product may then be mechanically processed, e.g., crushed or otherwise broken up and sorted to produce aggregate of the desired characteristics, e.g., size, particular shape, etc. In these processes the setting and mechanical processing steps may be performed in a substantially continuous fashion or at separate times. In certain embodiments, large volumes of precipitation material may be stored in the open environment where the precipitation material is exposed to the atmosphere. For the setting step, the precipitation material may be irrigated in a convenient fashion with fresh water, or allowed to be rained on naturally or order to produce the set product. The set product may then be mechanically processed as described above. Following production of the precipitation material, the precipitation material may be processed to produce the desired aggregate. In some embodiments, the precipitation material may be left outdoors, where rainwater may be used as the freshwater source, to cause the meteoric water stabilization reaction to occur, hardening the precipitation material to form aggregate.

In an example of one embodiment of the invention, the precipitation material may be mechanically spread in a uniform manner using a belt conveyor and highway grader onto a compacted earth surface to a depth of interest, e.g., up to twelve inches, such as 1 to 12 inches, including 6 to 12 inches. The spread material may then be irrigated with fresh water at a convenient rate, e.g., of one/half gallon of water per cubic foot of precipitation material. The material may then be compacted using multiple passes with a steel roller, such as those used in compacting asphalt. The surface may be re-irrigated on a weekly basis until the material exhibits the desired chemical and mechanical properties, at which point the material may be mechanically processed into aggregate by crushing.

In an example of an additional embodiment of the invention, the carbonate compound precipitation material, once separated from the mother liquor, may be washed with fresh water, then placed into a filter press to produce a filter cake with 30-60% solids. This filter cake may then be mechanically pressed in a mold, using any convenient means, e.g., a hydraulic press, at adequate pressures, e.g., ranging from 5 to 1000 psi, such as 1 to 200 psi, to produce a formed solid, e.g., a rectangular brick. These resultant solids may then be cured, e.g., by placing outside and storing, by placing in a chamber within which they are subjected to high levels of humidity and heat, etc. These resultant cured solids may then be used as building materials themselves or crushed to produce aggregate. Such aggregates, methods for their manufacture and use are further described in co-pending U.S. patent application Ser. No. 61/056,972, filed on May 29, 2008, the disclosure of which is incorporated herein by reference.

FIG. 1 provides a schematic flow diagram of a process for producing a carbonate/bicarbonate (e.g., $CO_2$-sequestering component) according to an embodiment of the invention. In FIG. 1, divalent cations from source of divalent cations 110 is subjected to carbonate compound precipitation conditions at precipitation step 120. As reviewed above, saltwater refers to any of a number of different types of aqueous fluids other than freshwater, including brackish water, seawater and brine (including man-made brines, e.g., geothermal plant wastewaters, desalination waste waters, etc), as well as other salines having a salinity greater than that of freshwater. The saltwater source from which the carbonate compound composition of the cements of the invention may be derived may be a naturally occurring source, such as a sea, ocean, lake, swamp, estuary, lagoon, etc., or a man-made source.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

In the embodiment depicted in FIG. 1, a solution of divalent cations from the source of divalent cations 110 is first charged with $CO_2$ to produce $CO_2$-charged water, which $CO_2$ is then subjected to carbonate compound precipitation conditions. As depicted in FIG. 1, a $CO_2$-containing gaseous stream 130 is contacted with the solution of divalent cations at precipitation step 120. The provided gaseous stream 130 is contacted with a suitable divalent-cation containing solution at precipitation step 120 to produce a $CO_2$-charged water. $CO_2$-charged water is water that has been in contact with $CO_2$ gas, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the $pCO_2$ of the waste stream that is contacted with the water. The $CO_2$-charged water may be acidic, having a pH of 6 or less, such as 5 or less and including 4 or less. In certain embodiments, the concentration of $CO_2$ of the gas used to charge the water may be 10% or higher, 25% or higher, including 50% or higher, such as 75% or even higher. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

At precipitation step 120, carbonate compounds, which may be amorphous or crystalline, are precipitated. Precipitation conditions of interest include those that change the physical environment of the water to produce the desired precipitation material. For example, the temperature of the water may be raised to an amount suitable for precipitation of the desired carbonate compound(s) to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitation material. In certain embodiments, the temperature may be raised using energy generated from low or zero carbon dioxide emission sources, e.g., solar energy source, wind energy source, hydroelectric energy source, etc. While the pH of the water may range from 7 to 14 during a given precipitation process, in certain embodiments the pH may be raised to alkaline levels in order to drive the precipitation of carbonate compound as desired. In certain of these embodiments, the pH may be raised to a level that minimizes if not eliminates $CO_2$ gas generation production during precipitation. In these embodiments, the pH may be raised to 10 or higher, such as 11 or higher. Where desired, the pH of the water may be raised using any convenient approach. In certain embodiments, a pH-raising agent may be employed, where examples of such agents include oxides, hydroxides (e.g., sodium hydroxide, potassium hydroxide, brucite), carbonates (e.g. sodium carbonate) and the like. The amount of pH-elevating agent that is added to the saltwater source will depend on the particular nature of the agent and the volume of saltwater being modified, and will be sufficient to raise the pH of the saltwater source to the desired value. Alternatively, the pH of the saltwater source may be raised to the desired level by electrolysis of the water.

$CO_2$ charging and carbonate compound precipitation may occur in a continuous process or at separate steps. As such, charging and precipitation may occur in the same reactor of a system, e.g., as illustrated in FIG. 1 at step 120, according to certain embodiments of the invention. In yet other embodiments of the invention, these two steps may occur in separate reactors, such that the water is first charged with $CO_2$ in a charging reactor (i.e., a gas-liquid or gas-liquid-solid contactor) and the resultant $CO_2$-charged water is then subjected to precipitation conditions in a separate reactor.

Following production of the carbonate-containing precipitation material from the water, the resultant precipitation material (i.e., resultant $CO_2$-sequestering component) may be separated from some or all the mother liquor to produce separated precipitation material, as illustrated in FIG. 1 at step 140. Separation of the precipitation material may be achieved using any convenient approach, including a mechanical approach, e.g., where bulk excess water is drained from the precipitation material, e.g., either by gravity alone or with the addition of vacuum, mechanical pressing, by filtering the precipitation material from the mother liquor to produce a filtrate, etc. For exemplary system and methods for bulk water removal that may be used in the invention, see U.S. Provisional Patent Application Nos. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference. Separation of bulk water produces a wet, dewatered precipitation material (i.e., dewatered $CO_2$-sequestering component of reduced-carbon footprint concrete compositions).

The resultant dewatered precipitation material may be used directly, or the resultant dewatered precipitation material may be further dried. In some embodiments, the resultant dewatered precipitation material may be used directly. Directly using the resultant dewatered precipitation material may be convenient in applications that require some amount of water. In a non-limiting example, dewatered precipitation material may be mixed with ordinary Portland cement, wherein the dewatered precipitation material provides at least a portion of the water needed for hydration and placement of the cement mixture. In some embodiments, the dewatered precipitation material may be more than 5% water, more than 10% water, more than 20% water, more than 30% water, more than 50% water, more than 60% water, more than 70% water, more than 80% water, more than 90% water, or more than 95% water. In some embodiments, the dewatered precipitation material provides at least 5% of the water, at least 10% of the water, at least 20% of the water, at least 30% of the water, at least 40% of the water, at least 50% of the water, at least 60% of the water, at least 70% of the water, at least 80% of the water, at least 90% of the water, or at least 95% of the water needed for the application that the dewatered precipitation material is being used. In some embodiments, the dewatered precipitation material provides all of the water needed for the application that the dewatered precipitation material is being used. For example, the dewatered precipitation material may provide all of the water needed for hydration and placement of a cement mixture of dewatered precipitation material and ordinary Portland cement. For instance, precipitation material may be dewatered such that the dewatered precipitation material comprises nearly 70% water, such as 66.5% water. The slurry of precipitation material may then be mixed with ordinary Portland cement such that the resultant cement mixture comprises 80% ordinary Portland cement and 20% precipitation material, wherein the water to cement (i.e., ordinary Portland cement and precipitation material) ratio is about 40%. By controlling the amount of water that is removed from the precipitation material, the carbon footprint of the material (e.g., reduced-carbon footprint concrete) being made from the precipitation material is being controlled as well, especially if the material requires water. With this in mind, the small, neutral, or negative carbon footprint of any of the product materials described herein may be further reduced by removing only as much water as needed from the precipitation material.

As described above, the resultant dewatered precipitation material may also be dried to produce a product, as illustrated at step 160 of FIG. 1. Drying may be achieved by air-drying the filtrate. Where the filtrate is air dried, air-drying may be at room or elevated temperature. Dewatered precipitation material may be air dried to produce a precipitation material that may be less than 50% water, less than 40% water, less than 30% water, less than 20% water, less than 10% water, or less than 5% water. For example, dewatered precipitation material may be air dried to produce a precipitation material that is 30% or less water. Such precipitation material may be crushed with or without additional processing (e.g., high sheer mixing) and combined with other materials such as ordinary Portland cement to produce a cement mixture comprising a portion of the water needed for hydration and placement of the cement mixture. Drying may also be achieved by spray drying the precipitation material, where the liquid containing the precipitation material is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitation material from liquid-solid separation may be washed before drying, as illustrated at optional step 150 of FIG. 1. The precipitation material may be washed with freshwater, e.g., to remove salts (such as NaCl) from the dewatered precipitation material.

Used wash water may be disposed of as convenient, e.g., by disposing of it in a tailings pond, etc.

At step 170, the dried precipitation material may be optionally refined, e.g., to provide for desired physical characteristics, such as particle size, surface area, etc., or to add one or more components to the precipitation material, such as admixtures, aggregate, supplementary cementitious materials, etc., to produce a final product 80.

FIGS. 4, 5, and 6 provide depictions of additional embodiments of processes for preparing $CO_2$-sequestering products. In FIG. 6, the source of $CO_2$ is directly from power plant flue gas. The flue gas may be dissolved into seawater, stripping the gas of $CO_2$, SOx, and NOx to exhaust clean air. When dissolved, the $CO_2$ converts to carbonic acid and forms carbonates with divalent cations (e.g., $Ca^{2+}$, $Mg^{2-}$) in the seawater to create SCM and aggregates, while the NOx and SOx are neutralized and sequestered as well. A slurry containing carbonates (e.g., calcium and/or magnesium carbonate) may formed and spray dried to create the desired particle sizes. The process includes sophisticated controls on sodium chloride, avoiding corrosive effects on reinforcement bar, and generates clean air and clean water that may be easier to desalinate due to reduced hardness (e.g., reduced concentrations of calcium and magnesium). Although magnesium is viewed as undesirable in concrete, this form of $MgCO_3$ is more akin to $CaCO_3$, rather than magnesium hydroxide ($Mg(OH)_2$), which is typically avoided.

In certain embodiments, a system such as system 200 of FIG. 2 may be employed to perform the above methods. System 200 of FIG. 2 includes $CO_2$-containing gas source 230 (e.g., flue gas from a coal-fired power plant). This system also includes a conveyance structure such as a pipe, duct, or conduit, which directs the $CO_2$-containing gas to processor 220 from $CO_2$-containing gas source 230. Also shown in FIG. 2 is divalent cation-containing solution source 210 (e.g., body of water, tank of divalent cation-containing solution, etc.). In some embodiments, divalent cation-containing solution source 210 includes a conveyance structure such as a pipe, duct, or conduit, which directs the divalent cation-containing solution (e.g., alkaline earth metal ion-containing aqueous solution) to the processor (220). Where the divalent cation-containing solution source is seawater, the conveyance structure is in fluid communication with the source of seawater (e.g., the input is a pipe line or feed from ocean water to a land-based system, or the input is an inlet port in the hull of a ship in an ocean-based system).

The aqueous solution of divalent cations provided to the processor or a component thereof (e.g. gas-liquid contactor, gas-liquid-solid contactor; etc.) may be recirculated by a recirculation pump such that absorption of $CO_2$-containing gas (e.g., comprising $CO_2$, SOx, NOx, metals and metal-containing compounds, particulate matter, etc.) is optimized within a gas-liquid contactor or gas-liquid-solid contactor within the processor. With or without recirculation, processors of the invention or a component thereof (e.g. gas-liquid contactor, gas-liquid-solid contactor; etc.) may effect at least 25%, 50%, 70%, or 90% dissolution of the $CO_2$ in the $CO_2$-containing gas. Dissolution of other gases (e.g., SOx) may be even greater, for example, at least 95%, 98%, or 99%. Additional parameters that provide optimal absorption of $CO_2$-containing gas include a specific surface area of 0.1 to 30, 1 to 20, 3 to 20, or 5 to 20 $cm^-$; a liquid side mass transfer coefficient ($k_L$) of 0.05 to 2, 0.1 to 1, 0.1 to 0.5, or 0.1 to 0.3 cm/s; and a volumetric mass transfer coefficient ($K_L a$) of 0.01 to 10, 0.1 to 8, 0.3 to 6, or 0.6 to 4.0 $s^{-1}$. In some embodiments, absorption of $CO_2$-containing gas by the aqueous solution of divalent cations causes precipitation of at least a portion of precipitation material in the gas-liquid contactor. In some embodiments, precipitation primarily occurs in a precipitator of the processor. The processor, while providing a structure for precipitation of precipitation material, may also provide a preliminary means for settling (i.e., the processor may act as a settling tank). The processor, whether providing for settling or not, may provide a slurry of precipitation material to a dewatering feed pump, which, in turn, provides the slurry of precipitation material to the liquid-solid separator where the precipitation material and the precipitation reaction mixture are separated.

The processor 220 may further include any of a number of different components, including, but not limited to, temperature regulators (e.g., configured to heat the precipitation reaction mixture to a desired temperature); chemical additive components (e.g., for introducing chemical proton-removing agents such as hydroxides, metal oxides, or fly ash); electrochemical components (e.g., cathodes/anodes); components for mechanical agitation and/or physical stirring mechanisms; and components for recirculation of industrial plant flue gas through the precipitation plant. Processor 220 may also contain components configured for monitoring one or more parameters including, but not limited to, internal reactor pressure, pH, precipitation material particle size, metal-ion concentration, conductivity, alkalinity, and $pCO_2$. Processor 220, in step with the entire precipitation plant, may operate as batch wise, semi-batch wise, or continuously.

Processor 220, further includes an output conveyance for slurry comprising precipitation material or separated supernatant. In some embodiments, the output conveyance may be configured to transport the slurry or supernatant to a tailings pond for disposal or a naturally occurring body of water, e.g., ocean, sea, lake, or river. In other embodiments, systems may be configured to allow for the slurry or supernatant to be employed as a coolant for an industrial plant by a line running between the precipitation system and the industrial plant. In certain embodiments, the precipitation plant may be co-located with a desalination plant, such that output water from the precipitation plant is employed as input water for the desalination plant. The systems may include a conveyance (i.e., duct) where the output water (e.g., slurry or supernatant) may be directly pumped into the desalination plant.

The system illustrated in FIG. 2 further includes a liquid-solid separator 240 for separating precipitation material from precipitation reaction mixture The liquid-solid separator may achieve separation of precipitation material from precipitation reaction mixture by draining (e.g., gravitational sedimentation of the precipitation material followed by draining), decanting, filtering (e.g., gravity filtration, vacuum filtration, filtration using forced air), centrifuging, pressing, or any combination thereof. At least one liquid-solid separator is operably connected to the processor such that precipitation reaction mixture may flow from the processor to the liquid-solid separator. Any of a number of different liquid-solid separators may be used in combination, in any arrangement (e.g., parallel, series, or combinations thereof), and the precipitation reaction mixture may flow directly to the liquid-solid separator, or the precipitation reaction mixture may be pre-treated.

System 200 also includes a washer (250) where bulk dewatered precipitation material from liquid-solid separator 240 is washed (e.g., to remove salts and other solutes from the precipitation material), prior to drying at the drying station (e.g., dryer 260).

The system may further include a dryer 260 for drying the precipitation material comprising carbonates (e.g., calcium carbonate, magnesium carbonate), bicarbonates, or a combination thereof produced in the processor. Depending on the particular system, the dryer may include a filtration element, freeze-drying structure, spray-drying structure, or the like. The system may include a conveyer (e.g., duct) from the industrial plant that is connected to the dryer so that a $CO_2$-containing gas (i.e., industrial plant flue gas) may be contacted directly with the wet precipitation material in the drying stage.

The dried precipitation material may undergo further processing (e.g., grinding, milling) in refining station 270 in order to obtain desired physical properties. One or more components may be added to the precipitation material during refining if the precipitation material is to be used as a building material.

The system further includes outlet conveyers (e.g., conveyer belt, slurry pump) configured for removal of precipitation material from one or more of the following: the processor, dryer, washer, or from the refining station. As described above, precipitation material may be disposed of in a number of different ways. The precipitation material may be transported to a long-term storage site in empty conveyance vehicles (e.g., barges, train cars, trucks, etc.) that may include both above ground and underground storage facilities. In other embodiments, the precipitation material may be disposed of in an underwater location. Any convenient conveyance structure for transporting the precipitation material to the site of disposal may be employed. In certain embodiments, a pipeline or analogous slurry conveyance structure may be employed, wherein these structures may include units for active pumping, gravitational mediated flow, and the like.

A person having ordinary skill in the art will appreciate that flow rates, mass transfer, and heat transfer may vary and may be optimized for systems and methods described herein, and that parasitic load on a power plant may be reduced while carbon sequestration is maximized.

Settable Compositions

Additional aspects of the invention are settable compositions that include reduced-carbon footprint concrete compositions of the invention combined with a water. Settable compositions of the invention may be produced by combining the concrete composition and water, either at the same time or by pre-combining a cement with aggregate, and then combining the resultant dry components with water.

The liquid phase, e.g., aqueous fluid, with which the dry component may be combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

Current cement standards such as ASTM C150 allow for the substitution of ground limestone for a portion of the clinker in making Portland cement. In the case of ASTM C150 the maximum allowable percentage is 5%. In some European standards there is allowance of higher percentages, often 10% but at times as high as 30%, of limestone as clinker replacement in making Portland cement. In these cases the limestone may be ground separately and blended with the Portland cement, but limestone aggregate may also be added to the clinker at the ball-milling stage and interground with the clinker and a small amount of gypsum to produce Portland cement.

The use of a calcium carbonate additive from a carbon sequestration precipitation reaction rather than natural mined limestone has several advantages for the cement producer. Assuming a 5% replacement of clinker with the precipitation material, the carbon footprint of the resultant cement may be reduced 7.2%, whereas in using ground limestone the carbon footprint may be only reduced 5% or less. Given the pressure on carbon footprint reduction which the Portland cement industry faces, the additional 2.2% further reduction in carbon footprint versus using mined limestone has considerable value.

An additional benefit of the use of a precipitated calcium carbonate as clinker replacement is that it is generally more pure than mined limestone. In many instances, impurities in the limestone limit the use of that limestone to less than the full allowed amount, due to impurities which reduce the properties of the resultant Portland cement. In certain Portland cement plants, ability to use local mined limestone is limited to perhaps 2.0%. The utilization of a carbon-sequestering precipitated calcium carbonate at 5% would result in an improvement in carbon footprint reduction of 5.2%, from 2.0% to 7.2%.

Reduction in carbon footprint of Portland cement by using carbon-sequestering precipitated calcium carbonate has the further advantage of potentially producing additional revenue via carbon credits. Because the material added, even if it is mined limestone, reduces the amount of clinker used, there is potential for obtaining carbon credits for emissions reduction from the cement facility. The sequestered $CO_2$ in the precipitation material may be utilized to increase the amount and value of the carbon credits available for clinker reduction.

Utility

The subject concretes and settable compositions that include the same, find use in a variety of different applications, particularly as building or construction materials. Specific structures in which the settable compositions of the invention find use include, but are not limited to: pavements, architectural structures, e.g., buildings, foundations, motorways/roads, overpasses, parking structures, brick/block walls and footings for gates, fences and poles, bridges, foundations, levees, dams. Mortars of the invention find use in binding construction blocks, e.g., bricks, together and filling gaps between construction blocks. Mortars can also be used to fix existing structure, e.g., to replace sections where the original mortar has become compromised or eroded, among other uses.

Embodiments of the invention find use in reducing the amount of $CO_2$ that is generated in producing buildings and then operating buildings. Specifically, the methods of the invention can reduce $CO_2$ generation in production of building materials, e.g., concrete. In addition, the methods can reduce $CO_2$ emission in power generation, which reduces $CO_2$ emissions connected with operating a building during its life.

The subject methods and systems find use in $CO_2$ sequestration, particularly via sequestration in the built environment. Sequestering $CO_2$ comprises removal or segregation of $CO_2$ from the gaseous stream, such as a gaseous waste stream, and fixating it into a stable non-gaseous form so that the $CO_2$ cannot escape into the atmosphere. $CO_2$ sequestration comprises the placement of $CO_2$ into a storage stable form, e.g., a component of the built environment, such as a building, road, dam, levee, foundation, etc. As such, sequestering of $CO_2$ according to methods of the invention results in prevention of $CO_2$ gas from entering the atmosphere and long-term storage of $CO_2$ in a manner that $CO_2$ does not become part of the atmosphere. By storage stable form is meant a form of matter that may be stored above ground or underwater under exposed conditions (i.e., open to the atmosphere, underwater environment, etc.) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage stable form undergoes little if any degradation while stored, the amount of degradation if any as measured in terms of $CO_2$ gas release from the product will not exceed 5%/year, and in certain embodiments will not exceed 1%/year. The above-ground storage stable forms may be storage stable under a variety of different environment conditions, e.g., from temperatures ranging from $-100°$ C. to $600°$ C., humidity ranging from 0 to 100%, where the conditions may be calm, windy, turbulent or stormy. The below water storage stable forms are similarly stable to with respect to underwater environment conditions. Embodiments of the methods may be used to capture all the waste $CO_2$ of industrial processes, e.g., power generation, cement production, chemical production, paper and steel mills, etc.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

All examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein as such embodiments are provided by way of example only. Indeed, numerous variations, changes, and substitutions may now occur to those skilled in the art without departing from the invention. It is intended that the following claims define the scope of the invention and that methods and structures within the scope of these claims and their equivalents be covered thereby.

Examples

I. Components of Reduced-Carbon Footprint Concrete Compositions

A. Supplementary Cementitious Mineral Admixture (SCMA)

Supplementary cementitious mineral admixture (SCMA) is a partial or full replacement for traditional SCMs that may be blended with Portland cement to significantly reduce the carbon footprint of concrete, while increasing the quality, strength, and durability of concrete. The SCMA is a reactive admixture that can replace a high volume of cement or fly ash with increased durability without issues such as early strength loss. The SCMA may be prepared as described in U.S. patent application Ser. No. 12/126,776, as well as in U.S. Provisional Patent Application Nos. 61/088,347 and 61/101,626; each of which are incorporated herein by reference.

i. FTIR

The FTIR uses a laser to excite and measure bond vibrations in materials. Using this method, we can indicate which compounds are present in the materials. An unhydrated and hydrated comparison, at 7 days, is shown in FIG. 7, between ordinary Portland cement paste (OPC) and a blended paste with 20% SCMA and 80% OPC. Though varied, the SCMA may be the basis and building block for many products, and demonstrates the basic chemical composition of all the products. In the above graph, the large band centered at 1450 $cm^{-1}$ indicates the large presence of carbonate in the SCMA. The peaks at 3694 $cm^{-1}$ and 2513 $cm^{-1}$ are indicative of the hydration of the SCMA. For the Hydrated Blended SCMA, we see the peak at 858 $cm^{-1}$ diminish with the peak at 872 $cm^{-1}$ becoming sharper, and the slope at 712 $cm^{-1}$ also sharpen. These mode locations are consistent with the formation of Calcite. The 2342 $cm^{-1}$ peak noted above is no longer present in the cement blend, which would be expected upon re-hydration of the product. The peak at 3694 $cm^{-1}$ corresponding to the OH stretching vibrations for $Mg(OH)_2$ is present, however $Ca(OH)_2$ formation (peak at 3644 $cm^{-1}$) appears to be inhibited compared to hydration in OPC. For the Hydrated OPC, it too has the signature $CO_3^{-2}$ modes observable at 1481 $cm^{-1}$ and 1426 $cm^{-1}$ due to carbonation of the cement. $Ca(OH)_2$ has a large peak at 3644 $cm^{-1}$ that corresponds to the OH stretching vibrations as well.

ii. XRD

The XRD scatters X-ray beams at different angels to measure the reflection off a sample. The reflections return a fingerprint to allow identification of a specific compound. From the XRD (See FIG. 8 and FIG. 9), a number of observations can be made for the hydrated OPC and Blended SCMA:

Ettringite and portlandite are present in both the OPC and blended SCMA.

The presence of calcite is shown in the SCMA, while the amount of portlandite formed is significantly reduced by 20%.

After 7 days, the SCMA shows little or no sign of halite (NaCl), or brucite, meeting ACI 318 standards for sodium chloride control.

The SCMA shows evidence of depletion of Mg in the calcite.

The calcium silicate phases seem to be consumed faster in the SCMA as well.

iii. SEM Images

SEM images (FIG. 10) show that both the Hydrated OPC and Blended SCMA pastes exhibit similar morphologies with acicular ettringite and C—S—H formation on the surface of the cement particles.

iv. X-Ray Fluorescence (XRF)

TABLE 1

| XRF elemental analysis of an SCM of the invention. | | | | | | | | | |
|---|---|---|---|---|---|---|---|---|---|
| Oxide | CaO | $SiO_2$ | $Al_2O_3$ | $Fe_2O_3$ | $SO_3$ | $Na_2O$ | MgO | Cl | $K_2O$ |
| Content (weight %) | 8.96 | 1.76 | 0.63 | 0.265 | 0.17 | 2.56 | 31.17 | 1.15 | 0.12 |
| Elemental (weight %) | 6.404 | 0.823 | 0.334 | 0.185 | 0.068 | 11.37 | 18.79 | 1.15 | 0.100 | v. Particle Size Analysis (PSA)

Particle size analysis of SCM of the invention indicates a median particle size of 10.86361 microns and a mean particle size of 11.26930 microns.

vi. SCMA is Reactive

As demonstrated in FIG. 11, SCMA is reactive.

vii. SCM Morphologies

FIG. 12 provides SCM morphologies.

B. Carbon Reducing Admixture (CRA)

CRA is both a mineral admixture and fine aggregate with particle sizes comparable to sand. CRA sequesters $CO_2$ in concrete and gives designers the potential to create carbon neutral or carbon negative concrete by replacing a portion or all of the fine aggregates in a mix design, without any cement replacement. CRA is produced according to methods described in U.S. Provisional Patent Application No. 61/056,972; the disclosure of which is incorporated herein by reference.

C. Coarse Aggregate (AGG).

Coarse aggregate (AGG) may replace a portion or all of the common coarse aggregate in a mix. AGG allows designers to create carbon neutral or carbon negative concrete without replacing any cement, and maintaining the strength of concrete. AGG CRA is produced according to methods described in U.S. Provisional Application No. 61/056,972; the disclosure of which is incorporated herein by reference.

D. Precipitation Material from Seawater

Seawater (900 gallons) was agitated and acidified by bubbling a 55 scfm, 10% carbon dioxide (balance air) gas stream through gas diffusers located at the bottom of a 1,000-gallon, covered plastic tank. The pH was monitored and dropped from approximately pH 8 to pH 5.5-6, at which point the gas diffusion was stopped. Magnesium hydroxide (1 g/L) from an industrial tailings pond that includes some calcite and silica was added to the acidified, agitated sea water; the pH rose to approximately pH 8. Gas diffusion re-started until the pH dropped to pH 7, after which the gas flow was arrested.

A total of 22 kg of magnesium hydroxide was added as a 10% slurry to the acidic sea water in incremental doses in the following repeated manner: magnesium hydroxide slurry was added to agitated sea water until the pH increased to pH 8. The 10% carbon dioxide gas delivery was re-started until the pH of the agitated sea water returned to pH 7. The gas delivery was arrested, and slurry added until the pH returned to pH 8. After 22 kg of magnesium hydroxide was consumed, the pH of the agitated sea water was reduced to pH 7 by diffusion with 10% carbon dioxide gas, after which gas delivery was stopped. Approximately 43 kg of 50% (w/w) NaOH (aq) was added to the agitated sea water until the pH of the sea water reached pH 10.15. The resultant precipitation material was gravity separated then vacuum filtered from the supernatant solution. The filter cake was oven-dried at 110° C., then ball milled.

Precipitation Material Characterization

X-ray fluorescence (XRF) data (Table 2) indicates that the precipitation material is mostly composed of magnesium and calcium carbonates.

TABLE 2

XRF elemental analysis of precipitation material.

| | Na | Mg | Al | Si | S | Cl | K | Ca | Fe |
|---|---|---|---|---|---|---|---|---|---|
| Weight % | 1.86 | 19.48 | 0.28 | 0.71 | 0.07 | 1.36 | 0.13 | 8.10 | 0.20 |

TABLE 3

Percent $CO_2$ content (coulometry).

| | % $CO_2$ |
|---|---|
| Weight % | 49.63 |

X-ray diffraction (XRD) and thermogravimetric analysis (TGA/DTG) of the precipitation material indicate the presence of hydromagnesite and aragonite ($CaCO_3$) as the major phases, and halite (NaCl) as a minor component. The XRD of the precipitation material was compared against standards for hydromagnesite, aragonite, and hydromagnesite. The TGA/DTG indicated inflection points/peaks at 257° C. and 412° C. indicating hydromagnesite, and the TGA/DTG indicated an inflection point/peak at 707° C. indicating aragonite. The results were also confirmed by infrared spectroscopy (IR), which was used to generate a composite plot for each of aragonite, hydromagnesite, and the precipitation material. Such precipitation material is useful in production of reduced-carbon footprint concrete compositions of the invention.

E. Precipitation Material from Seawater

Seawater (900 gallons) was agitated and acidified by bubbling a 55 scfm 10% carbon dioxide (balance air) gas stream through gas diffusers located at the bottom of a 1,000-gallon, covered plastic tank. The pH was monitored and dropped from approximately pH 8 to pH 5.5-6, at which point the gas diffusion was stopped. Magnesium hydroxide (1 g/L) was added to the acidified, agitated sea water; the pH rose to approximately pH 8. Gas diffusion was re-started until the pH dropped to pH 7, after which the gas flow was arrested. A total of 30 kg of 50% (w/w) NaOH (aq) was then added to the agitated sea water in incremental doses in the following repeated manner: NaOH was added to agitated sea water until the pH increased to pH 8. The 10% carbon dioxide gas delivery was re-started until the pH of the agitated sea water returned to pH 7. The gas delivery was arrested, and NaOH added until the pH returned to pH 8. After 30 kg of 50% (w/w) NaOH (aq) was consumed, the pH of the agitated sea water was reduced to pH 7 by diffusion with 10% carbon dioxide gas, after which gas delivery was stopped. Approximately 37 kg of 50% (w/w) NaOH (aq) was added to the agitated sea water until the pH of the sea water reached pH 10.15. The resultant precipitation material was gravity separated then vacuum filtered from the supernatant solution. The filter cake was re-slurried in fresh water, spray-dried, then ball milled.

Precipitation Material Characterization

X-ray fluorescence (XRF) data (Table 4) indicates that the precipitation material is mostly composed of magnesium and calcium carbonates.

TABLE 4

XRF elemental analysis of precipitation material

| | Na | Mg | Al | Si | S | Cl | K | Ca | Fe |
|---|---|---|---|---|---|---|---|---|---|
| Weight % | 7.13 | 13.84 | 0.10 | 0.11 | 0.17 | 4.75 | 0.17 | 5.63 | 0.03 |

TABLE 5

| Percent CO2 content (Coulometry) | |
|---|---|
| | % $CO_2$ |
| Weight % | 53.60 |

X-ray diffraction (XRD) and thermogravimetric analysis (TGA/DTG) of the precipitation material indicates the presence of nesquehonite ($MgCO_3 \cdot 3H_2O$) and aragonite ($CaCO_3$) as the major phases, and halite (NaCl) as a minor component. The XRD of the precipitation material was compared against standards for nesquehonite and aragonite. The TGA/DTG indicated inflection points/peaks at 132° C., 364° C., 393° C., and 433° C. indicating nesquehonite, and the TGA/DTG indicated an inflection point/peak at 697° C. indicating aragonite. The results were also confirmed by infrared spectroscopy (IR), which was used to generate a composite plot for each of nesquehonite, aragonite, and the precipitation material. Such precipitation material is useful in production of reduced-carbon footprint concrete compositions of the invention.

F. Precipitation Material from Seawater

Seawater (76,000 gallons) was mixed in a 200,000-gallon open vessel by pumping its contents through two lines with two pumps, which returned the contents into the tank with an upward, circular trajectory. Carbon dioxide gas (100%) was diffused into the seawater via diffusers located in the bottom of the tank to reduce the pH to about pH 5.5. Approximately 800 kg of magnesium hydroxide from a tailings pond, containing some calcite and silica, was slurried with seawater and injected into the open vessel through a recirculation device based on the operating premise of a pool sand-filter. After addition of the magnesium hydroxide, the 100% carbon dioxide gas delivery was arrested. Caustic (50% (w/w) NaOH (aq)) was then added through a recirculation line until the pH of the slurry was pH 9.5. The slurry was then transferred to a settling pond where the supernatant was decanted and the gravity-settled solids collected for spray drying. The slurry was spray-dried and collected from the main chamber of the spray dryer.

Precipitation Material Characterization

X-ray fluorescence (XRF) data (not shown) indicates that the precipitation material is mostly composed of magnesium and calcium carbonates

TABLE 6

| Percent CO2 content (Coulometry) | |
|---|---|
| | % CO2 |
| Weight % | 33.06 |

X-ray diffraction (XRD) and thermogravimetric analysis (TGA/DTG) of the precipitation material indicates the presence of nesquehonite ($MgCO_3 \cdot 3H_2O$) and monohydrocalcite ($CaCO_3 \cdot H_2O$) as the major phases, and aragonite ($CaCO_3$) and halite (NaCl) as a minor components. The XRD of the precipitation material was compared against standards for nesquehonite, aragonite, and monohydrocalcite. The TGA/DTG indicated inflection points/peaks at 136° C., 187° C., and 421° C. indicating nesquehonite, and the TGA/DTG indicated an inflection point/peak at 771° C. indicating aragonite and monohydrocalcite. The results were also confirmed by infrared spectroscopy (IR), which was used to generate a composite plot for each of nesquehonite, aragonite, monohydrocalcite, and the precipitation material. Such precipitation material is useful in production of reduced-carbon footprint concrete compositions of the invention.

II. Carbon Footprint Comparisons

Below are mix designs with corresponding carbon footprint reductions expected from using products of the invention. The carbon footprint of concrete is determined by multiplying the pounds per cubic yard of each constituent by its per pound carbon footprint, summing these values, and adding 10.560 kg/yd$^3$ (the carbon footprint of transporting one yard of concrete 20 miles on average).

Transportation Footprint:

The European Commission has released figures of 160 g $CO_2$/tonne of material/km for transportation by truck (for aggregate, cement, and concrete). The Carbon footprint of cement shipped by sea from Asia to California has been estimated to be 0.150 lb $CO_2$ per pound of ocean-freighted material.

Assuming an average distance of 50 miles for hauling aggregate, and a production carbon footprint of 0.03 lbs $CO_2$/lb aggregate, the average carbon footprint of aggregate is approximately 0.043 lbs $CO_2$/lb aggregate.

Fly ash and slag rail costs from across the nation have been estimated to be only 0.020 lbs per lbs of fly ash. Assuming an average of 100 miles of trucking from the fly ash or slag, the carbon footprint of conventional SCMs are approximately 0.045 lbs $CO_2$/lb fly ash or slag.

Production Footprint:

Assuming an average $CO_2$ release from Portland cement production of 0.86 tonnes $CO_2$/tonne cement (as reported for California Cement Climate Action Team), each pound of Portland cement has a production carbon footprint of 0.86 pounds. Assuming an average transportation distance of 100 miles, the transportation footprint for each pound of Portland cement would be 0.016 pounds, for a total carbon footprint of 0.876 pounds $CO_2$ per pound of Portland cement.

Carbon Reductions:

Materials such as SCMA, CRA, and AGG have a sequestered $CO_2$ content of roughly 50%, which is −0.500 pounds of $CO_2$ per pound of material. Production and transportation carbon footprint (assuming trucking distance of 100 miles on average) is approximately 0.050 pounds of $CO_2$ per pound of material. Leaving a total carbon footprint of −0.450 lbs $CO_2$ per pound of material.

A. 100% OPC Mix

TABLE 7

Concrete composition having a carbon footprint of 630.18 lbs $CO_2$/yd$^3$ concrete.

| Ingredient | lbs $CO_2$/lb ingredient | lbs ingredient/yd$^3$ concrete | lbs $CO_2$/yd$^3$ concrete |
|---|---|---|---|
| Portland Cement | 0.876 | 564 | 494.06 |
| Water | 0.01 | 282 | 2.82 |
| Fly Ash | 0.045 | 0 | 0 |
| SCMA | (0.450) | 0 | 0 |
| Fine Aggregate | 0.043 | 1,300 | 55.90 |
| CRA | (0.450) | 0 | 0 |
| Coarse Aggregate | 0.043 | 1,800 | 77.40 |
| AGG | (0.450) | 0 | 0 |
| TOTALS | | 3,946 | 630.18 |

This example of a typical 6-sack concrete mix has a carbon footprint of 630 pounds per cubic yard. To mitigate this carbon emission biologically would require growing a one-foot diameter tree 27 feet tall. Each 10 yard load equates to growing a grove of ten of these trees!

B. High Fly Ash (50%) Mix

TABLE 8

Concrete composition having a carbon footprint of 395.84 lbs $CO_2/yd^3$ concrete.

| Ingredient | lbs $CO_2$/lb ingredient | lbs ingredient/$yd^3$ concrete | lbs $CO_2/yd^3$ concrete |
|---|---|---|---|
| Portland Cement | 0.876 | 282 | 247.03 |
| Water | 0.01 | 282 | 2.82 |
| Fly Ash | 0.045 | 282 | 12.69 |
| SCMA | (0.450) | 0 | 0 |
| Fine Aggregate | 0.043 | 1,300 | 55.90 |
| CRA | (0.450) | 0 | 0 |
| Coarse Aggregate | 0.043 | 1,800 | 77.40 |
| AGG | (0.450) | 0 | 0 |
| TOTALS | | 3,946 | 395.84 |

This example of a typical 6-sack concrete mix with 50% fly ash replacement has a carbon footprint of 395 pounds per cubic yard. This is a reduction in carbon footprint of 37% from a straight 6-sack Portland cement mixture.

C. Reduced Carbon Mix with Improved Working Properties

TABLE 9

Concrete composition having a carbon footprint of 386.44 lbs $CO_2/yd^3$ concrete.

| Ingredient | lbs $CO_2$/lb ingredient | lbs ingredient/$yd^3$ concrete | lbs $CO_2/yd^3$ concrete |
|---|---|---|---|
| Portland Cement | 0.876 | 338 | 296.09 |
| Water | 0.01 | 282 | 2.82 |
| Fly Ash | 0.045 | 113 | 5.08 |
| SCMA | (0.450) | 113 | (50.85) |
| Fine Aggregate | 0.043 | 1,300 | 55.90 |
| CRA | (0.450) | 0 | 0 |
| Coarse Aggregate | 0.043 | 1,800 | 77.40 |
| AGG | (0.450) | 0 | 0 |
| TOTALS | | 3,946 | 386.44 |

This example of a 6-sack concrete mix with 20% SCMA, 20% fly ash and 60% OPC has a carbon footprint of 386 pounds per cubic yard −2% lower carbon footprint than a 50% OPC/50% fly ash mix. This mix achieves a lower carbon footprint without the set-time and early strength gain issues of 50% fly ash mixes, as illustrated in FIG. 3.

D. Carbon Neutral Mix with 6 Sacks of OPC

TABLE 10

Concrete composition having a carbon footprint of 494.06 lbs $CO_2/yd^3$ concrete.

| Ingredient | lbs $CO_2$/lb ingredient | lbs ingredient/$yd^3$ concrete | lbs $CO_2/yd^3$ concrete |
|---|---|---|---|
| Portland Cement | 0.876 | 564 | 494.06 |
| Water | 0.01 | 282 | 2.82 |
| Fly Ash | 0.045 | 0 | 0 |
| SCMA | (0.450) | 0 | 0 |
| Fine Aggregate | 0.043 | 1,300 | 55.90 |
| CRA | (0.450) | 1,400 | (630.00) |

TABLE 10-continued

Concrete composition having a carbon footprint of 494.06 lbs $CO_2/yd^3$ concrete.

| Ingredient | lbs $CO_2$/lb ingredient | lbs ingredient/$yd^3$ concrete | lbs $CO_2/yd^3$ concrete |
|---|---|---|---|
| Coarse Aggregate | 0.043 | 1,700 | 73.10 |
| AGG | (0.450) | 0 | 0 |
| TOTALS | | 3,946 | (4.12) |

This example of a carbon neutral 6-sack concrete mix uses CRA to replace a portion of the fine aggregate.

E. Carbon Neutral Mix with High OPC Replacement & Improved Working Properties

TABLE 11

Concrete composition having a carbon footprint of −3.96 lbs $CO_2/yd^3$ concrete.

| Ingredient | lbs $CO_2$/lb ingredient | lbs ingredient/$yd^3$ concrete | lbs $CO_2/yd^3$ concrete |
|---|---|---|---|
| Portland Cement | 0.876 | 338 | 296.09 |
| Water | 0.01 | 282 | 2.82 |
| Fly Ash | 0.045 | 113 | 5.08 |
| SCMA | (0.450) | 113 | (50.85) |
| Fine Aggregate | 0.043 | 600 | 25.50 |
| CRA | (0.450) | 800 | (360) |
| Coarse Aggregate | 0.043 | 1,800 | 77.40 |
| AGG | (0.450) | 0 | 0 |
| TOTALS | | 3,946 | (3.96) |

This example of a carbon-neutral 6-sack concrete mix uses CRA to replace a portion of the fine aggregate along with the use of SCMA and fly ash with each at a 20% replacement level.

Additional mixes of interest include:

TABLE 12

Concrete composition having a carbon footprint of 293 lbs $CO_2/yd^3$ concrete.

| Ingredient | lb $CO_2$/lb ingredient | lb ingredient/$yd^3$ concrete | lb $CO_2/yd^3$ concrete |
|---|---|---|---|
| Portland Cement | 0.876 | 338 | 296.1 |
| Water | 0.01 | 271 | 2.7 |
| Fine Aggregate | 0.013 | 1,250 | 16.3 |
| Coarse Aggregate | 0.013 | 1,800 | 23.4 |
| Fly Ash | 0.045 | 113 | 5.1 |
| CM-SCM | (0.450) | 113 | (50.9) |
| Fine-SA | 0 | 0 | 0 |
| Coarse-SA | 0 | 0 | 0 |
| TOTALS | | 3,885 | 293 |

TABLE 13

Concrete composition having a carbon footprint of 386.7 lbs $CO_2/yd^3$ concrete.

| Ingredient | lb $CO_2$/lb ingredient | lb ingredient/$yd^3$ concrete | lb $CO_2/yd^3$ concrete |
|---|---|---|---|
| Portland Cement | 0.876 | 451 | 395.1 |
| Water | 0.01 | 282 | 2.8 |
| Fine Aggregate | 0.013 | 1250 | 16.3 |
| Coarse Aggregate | 0.013 | 1,800 | 23.4 |

TABLE 13-continued

Concrete composition having a carbon footprint of 386.7 lbs CO$_2$/yd$^3$ concrete.

| Ingredient | lb CO$_2$/lb ingredient | lb ingredient/yd$^3$ concrete | lb CO$_2$/yd$^3$ concrete |
|---|---|---|---|
| Fly Ash | 0 | 0 | 0 |
| CM-SCM | (0.450) | 113 | (50.9) |
| Fine-SA | 0 | 0 | 0 |
| Coarse-SA | 0 | 0 | 0 |
| TOTALS | | 3,896 | 386.7 |

TABLE 14

Concrete composition having a carbon footprint of −0.9 lbs CO$_2$/yd$^3$ concrete.

| Ingredient | lb CO$_2$/lb ingredient | lb ingredient/yd$^3$ concrete | lb CO$_2$/yd$^3$ concrete |
|---|---|---|---|
| Portland Cement | 0.876 | 338 | 296.1 |
| Water | 0.01 | 271 | 2.7 |
| Fine Aggregate | 0.013 | 616 | 8.0 |
| Coarse Aggregate | 0.013 | 1,800 | 23.4 |
| Fly Ash | 0.045 | 113 | 5.1 |
| CM-SCM | (0.450) | 113 | (50.9) |
| Fine-SA | (0.450) | 634 | (285.3) |
| Coarse-SA | (0.450) | 0 | 0 |
| TOTALS | | 3,885 | (0.9) |

TABLE 15

Concrete composition having a carbon footprint of −0.8 lbs CO$_2$/yd$^3$ concrete.

| Ingredient | lb CO$_2$/lb ingredient | lb ingredient/yd$^3$ concrete | lb CO$_2$/yd$^3$ concrete |
|---|---|---|---|
| Portland Cement | 0.876 | 564 | 494.1 |
| Water | 0.01 | 282 | 2.8 |
| Fine Aggregate | 0.013 | 138 | 1.8 |
| Coarse Aggregate | 0.013 | 1,800 | 23.4 |
| Fly Ash | 0.045 | 0 | 0 |
| CM-SCM | (0.450) | 0 | 0 |
| Fine-SA | (0.450) | 1,162 | (522.9) |
| Coarse-SA | (0.450) | 0 | 0 |
| TOTALS | | 3,946 | (0.8) |

F. High Carbon Capturing Mixes

TABLE 16

Concrete composition having a carbon footprint of −1,168.86 lbs CO$_2$/yd$^3$ concrete.

| Ingredient | lbs CO$_2$/lb ingredient | lbs ingredient/yd$^3$ concrete | lbs CO$_2$/yd$^3$ concrete |
|---|---|---|---|
| Portland Cement | 0.876 | 338 | 269.09 |
| Water | 0.01 | 282 | 2.82 |
| Fly Ash | 0.045 | 113 | 5.08 |
| SCMA | (0.450) | 113 | (50.85) |
| Fine Aggregate | 0.043 | 0 | 0 |
| CRA | (0.450) | 1,300 | (585.00) |
| Coarse Aggregate | 0.043 | 0 | 0 |
| AGG | (0.450) | 1,800 | (810.00) |
| TOTALS | | 3,946 | (1,168.86) |

This carbon-sequestering concrete illustrates the potential for high-carbon capturing concrete by using materials of the invention as a replacement for both coarse and fine aggregate as well as using SCMA and fly ash each at a 20% replacement level. Each 10-yard load of this mix is the carbon equivalent of growing 19 trees 1-foot in diameter and 27 feet tall!

Additional High Carbon Capturing Formulations are provided below:

TABLE 17

Concrete composition having a carbon footprint of −1,119.47 lbs CO$_2$/yd$^3$ concrete.

| Ingredient | lbs CO$_2$/lb ingredient | lbs ingredient/yd$^3$ concrete | lbs CO$_2$/yd$^3$ concrete |
|---|---|---|---|
| Portland Cement | 0.876 | 338 | 269.09 |
| Water | 0.01 | 271 | 2.71 |
| Fly Ash | 0.045 | 113 | 5.09 |
| SCMA | (0.450) | 113 | (50.85) |
| Fine Aggregate | 0.043 | 0 | 0 |
| CRA | (0.450) | 1,250 | (562.50) |
| Coarse Aggregate | 0.043 | 0 | 0 |
| AGG | (0.450) | 1,800 | (810.00) |
| TOTALS | | 3,885 | (1,119.47) |

TABLE 18

Concrete composition having a carbon footprint of −1,146 lbs CO$_2$/yd$^3$ concrete.

| Ingredient | lb CO$_2$/lb ingredient | lb ingredient/yd$^3$ concrete | lb CO$_2$/yd$^3$ concrete |
|---|---|---|---|
| Portland Cement | 0.876 | 338 | 269.1 |
| Water | 0.01 | 271 | 2.7 |
| Fine Aggregate | 0.013 | 0 | 0 |
| Coarse Aggregate | 0.013 | 0 | 0 |
| Fly Ash | 0.045 | 113 | 5.1 |
| CM-SCM | (0.450) | 113 | (50.9) |
| Fine-SA | (0.450) | 1,250 | (562.5) |
| Coarse-SA | (0.450) | 1,800 | (810.0) |
| TOTALS | | 3,885 | (1,146) |

TABLE 19

Concrete composition having a carbon footprint of 1,145 lbs CO$_2$/yd$^3$ concrete.

| Ingredient | lbs ingredient/yd ingredient | lbs CO$_2$/lb ingredient | lbs CO$_2$/yd concrete |
|---|---|---|---|
| Portland Cement | 338 | 0.88 | 270 |
| Water | 282 | 0.01 | 3 |
| Fine Aggregate | 0 | 0.04 | 0 |
| Coarse Aggregate | 0 | 0.04 | 0 |
| Fly Ash | 113 | 0.045 | 5 |
| SCM | 113 | (0.45) | (51) |
| CRA | 1,250 | (0.45) | (563) |
| AGG | 1,800 | (0.45) | (810) |
| TOTALS | 3,885 | | (1,145) |

Although the foregoing invention has been described in some detail by way of illustration and example for purposes of clarity of understanding, it is readily apparent to those of ordinary skill in the art, in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method comprising:
   a) producing synthetic carbonates from a divalent cation-containing solution and an industrial waste gas comprising $CO_2$;
   b) producing from the synthetic carbonates
      i) a first material comprising a supplementary cementitious material comprising carbonates, bicarbonates, or a combination thereof, wherein the supplementary cementitious material reacts with a hydraulic cement composition, and additionally
      ii) a second material comprising a concrete component comprising carbonates, bicarbonates, or a combination thereof selected from the group consisting of cement, aggregate, and pozzolanic material; and
   c) incorporating the supplementary cementitious material into a concrete composition.

2. The method of claim 1, wherein at least one of the synthetic carbonates comprise aragonite, hydromagnesite, monohydrocalcite, or a combination thereof.

3. The method of claim 1, wherein the synthetic carbonates have a $\delta^{13}C$ less than –10‰.

4. The method of claim 1, wherein the synthetic carbonates have a $\delta^{13}C$ less than –20‰.

5. The method of claim 1, wherein the synthetic carbonates have a $\delta^{13}C$ less than –30‰.

6. The method of claim 1, further comprising incorporating the concrete component into the concrete composition.

7. The method of claim 6, wherein the concrete component comprises aggregate.

8. The method of claim 1 or claim 6, further comprising determining a carbon footprint for the concrete composition, wherein determining the carbon footprint consists essentially of the steps of
   i) multiplying the number of pounds of a concrete component per cubic yard of the concrete component by the number of pounds of carbon dioxide per pound of the concrete component to obtain a multiplication product;
   ii) repeating step i) for each concrete component in the concrete composition;
   iii) summing the one or more multiplication products corresponding to the concrete composition to obtain the carbon footprint for the concrete composition.

9. The method of claim 8 wherein the concrete composition is a reduced-carbon concrete composition, such that a cubic yard of the reduced-carbon footprint concrete composition has a carbon footprint that is less than a carbon footprint of a cubic yard of an ordinary Portland concrete composition consisting essentially of ordinary Portland cement produced by a process of calcining a carbonate source, water, fine aggregate, and coarse aggregate, the carbon footprint for the ordinary Portland concrete composition being as determined in steps i)-iii) of claim 8.

10. The method of claim 9, wherein the reduced-carbon footprint concrete composition has a carbon footprint that is at least 25% less than the carbon footprint of the ordinary Portland concrete composition.

11. The method of claim 9, wherein the reduced-carbon footprint concrete composition has a carbon footprint that is at least 50% less than the carbon footprint of the ordinary Portland concrete composition.

12. The method of claim 9, wherein the reduced-carbon footprint concrete composition has a carbon footprint that is at least 75% less than the carbon footprint of the ordinary Portland concrete composition.

13. The method of claim 8, wherein the reduced-carbon footprint concrete composition has a carbon footprint that is neutral.

14. The method of claim 8, wherein the reduced-carbon footprint concrete composition has a carbon footprint that is negative.

15. The method of claim 14, wherein the negative carbon footprint is –250 lbs $CO_2/yd^3$ or less.

16. The method of claim 14, wherein the negative carbon footprint is –500 lbs $CO_2/yd^3$ or less.

* * * * *

UNITED STATES PATENT AND TRADEMARK OFFICE
CERTIFICATE OF CORRECTION

| | | |
|---|---|---|
| PATENT NO. | : 7,815,880 B2 | Page 1 of 1 |
| APPLICATION NO. | : 12/604383 | |
| DATED | : October 19, 2010 | |
| INVENTOR(S) | : Brent R. Constantz et al. | |

It is certified that error appears in the above-identified patent and that said Letters Patent is hereby corrected as shown below:

Column 53, line 25 (claim 1): "producing" should be replaced with --precipitating--.

Column 53, line 41 (claim 2): replace entire line beginning with "synthetic carbonates" and ending with "hydromagnesite" with --synthetic carbonates comprises aragonite, nesquehonite, hydromagnesite--.

Signed and Sealed this
Fifth Day of April, 2011

David J. Kappos
*Director of the United States Patent and Trademark Office*